(12) United States Patent
Mineo et al.

(10) Patent No.: US 12,095,601 B2
(45) Date of Patent: Sep. 17, 2024

(54) ASYNCHRONOUS BIT DETECTION MECHANISM FOR ASK DEMODULATORS

(71) Applicant: STMicroelectronics International N.V., Geneva (CH)

(72) Inventors: Andrea Mineo, Tremestieri Etneo (IT); Giovanni Amedeo Cirillo, Turin (IT)

(73) Assignee: STMicroelectronics International N.V., Geneva (CH)

( * ) Notice: Subject to any disclaimer, the term of this patent is extended or adjusted under 35 U.S.C. 154(b) by 14 days.

(21) Appl. No.: 18/064,593

(22) Filed: Dec. 12, 2022

(65) Prior Publication Data

US 2024/0195665 A1    Jun. 13, 2024

(51) Int. Cl.
*H04L 27/06*    (2006.01)

(52) U.S. Cl.
CPC ................... *H04L 27/06* (2013.01)

(58) Field of Classification Search
CPC ........................................ H04L 27/06
See application file for complete search history.

(56) References Cited

U.S. PATENT DOCUMENTS

| | | | |
|---|---|---|---|
| 9,577,474 B2 | 2/2017 | Watanabe et al. | |
| 10,862,719 B1 | 12/2020 | Teo | |
| 2015/0069849 A1 | 3/2015 | Watanabe et al. | |
| 2016/0336785 A1 | 11/2016 | Gao et al. | |
| 2023/0259480 A1* | 8/2023 | Narayana Iyer | G06F 13/4295 710/105 |

FOREIGN PATENT DOCUMENTS

| | | |
|---|---|---|
| EP | 3817238 A1 | 5/2021 |
| WO | 2021091024 A1 | 5/2021 |
| WO | 2021247441 A1 | 12/2021 |

* cited by examiner

*Primary Examiner* — Rahel Guarino
(74) *Attorney, Agent, or Firm* — Slater Matsil, LLP

(57) ABSTRACT

According to an embodiment, a circuit for decoding a biphase mark coding (BMC) encoded signal is provided. The circuit includes a matched filter, a decoder circuit and a finite state machine (FSM) circuit. The matched filter is configured to generate a first response and a second response to the BMC encoded signal. The first response and second response operate respectively, at a half clock period and a full clock period of the BMC encoded signal. The detector circuit is coupled to an output of the matched filter. The detector circuit is configured to generate an output signal based on detecting a half-bit rise for the first response, a half-bit fall for the first response, a full-bit rise for the second response, or a full-bit fall for the second response. The FSM circuit is configured to decode the BMC encoded signal based on the output signal of the detector circuit.

20 Claims, 17 Drawing Sheets

| TRANSITION | HALF-BIT RISE | HALF-BIT FALL | FULL-BIT RISE | FULL-BIT FALL |
|---|---|---|---|---|
| 1 | 1 |  | 0 | 0 |
| 2 |  | 1 | 0 | 0 |
| 3 |  |  | 1 | 0 |
| 4 |  |  | 0 | 1 |
| 5 | 0 | 0 |  |  |
| 6 |  |  | 1 | 1 |
| 7 |  | 1 |  |  |
| 8 | 1 |  |  |  |
| 9 |  |  |  |  |
| 10 |  |  |  |  |

ASYNCHRONOUS BIT DETECTION MECHANISM FOR ASK DEMODULATORS

TECHNICAL FIELD

The present disclosure generally relates to wireless communications and, in particular embodiments, to an asynchronous bit detection mechanism and circuit for amplitude shift keying (ASK) demodulators.

BACKGROUND

Wireless power systems provide wireless energy transfer between at least two devices. The transmitting device generates an electromagnetic field, and the receiving device receives the energy using inductive coupling. The receiving device stores the energy in a battery or consumes the power in a load.

Generally, a Qi-compatible wireless power system uses backscatter modulation, such as amplitude-shift keying (ASK) modulation, and a message coding scheme to relay message information from the receiving device (i.e., power receiver) to the transmitting device (i.e., power transmitter).

In ASK modulation, the receiving device transmits digital data by modulating the amplitude of the carrier wave. The message information can be used to, for example, relay the condition of receiving device condition such that the transmitting device adjusts the power transfer parameters. Therefore, a robust and reliable method for demodulating the message information in a wireless power system is desired.

SUMMARY

Technical advantages are generally achieved by embodiments of this disclosure which describe an asynchronous bit detection mechanism and circuit for amplitude shift keying (ASK) demodulators.

A first aspect relates to a circuit for decoding a biphase mark coding (BMC) encoded signal. The circuit includes a matched filter, a decoder circuit and a finite state machine (FSM) circuit. The matched filter is configured to generate a first response and a second response to the BMC encoded signal. The first response and second response operate respectively, at a half clock period and a full clock period of the BMC encoded signal. The detector circuit is coupled to an output of the matched filter. The detector circuit is configured to generate an output signal based on detecting a half-bit rise for the first response, a half-bit fall for the first response, a full-bit rise for the second response, or a full-bit fall for the second response. The FSM circuit is configured to decode the BMC encoded signal based on the output signal of the detector circuit.

In a first implementation form of the circuit according to the first aspect as such, the matched filter includes a first matched filter configured to match pulses on the half clock period and generate the first response; and a second matched filter configured to match pulses on the full clock period and generate the second response.

In a second implementation form of the circuit according to the first aspect as such or any preceding implementation form of the first aspect, the detector includes a first rising detector circuit, a first falling detector circuit, a second rising detector circuit, and a third falling detector circuit. The first rising detector circuit is configured to generate a first output corresponding to a half-bit rise based on determining whether the first response has a rising transition and crossing a first threshold at the half clock period. The first falling detector circuit is configured to generate a second output corresponding to a half-bit fall based on determining whether the first response has a falling transition and crossing a second threshold at the half clock period. The second rising detector circuit is configured to generate a third output corresponding to the full-bit rise based on determining whether the second response has a rising transition and crossing a third threshold at the full clock period. And, the third falling detector circuit is configured to generate a fourth output corresponding to the full-bit fall based on determining whether the second response has a falling transition and crossing a fourth threshold at the full clock period.

In a third implementation form of the circuit according to the first aspect as such or any preceding implementation form of the first aspect, the FSM being configured to decode the BMC encoded signal includes decoding the BMC encoded signal based on the first output, the second output, the third output, the fourth output, or a combination thereof.

In a fourth implementation form of the circuit according to the first aspect as such or any preceding implementation form of the first aspect, the circuit is an asynchronous circuit.

In a fifth implementation form of the circuit according to the first aspect as such or any preceding implementation form of the first aspect, the FSM circuit is a six-state FSM circuit.

In a sixth implementation form of the circuit according to the first aspect as such or any preceding implementation form of the first aspect, the FSM circuit includes a start state, a half-bit rise state, a bit "1" detected fall state, a half-bit fall state, a bit "1" detected rise state, and a bit "0" detected state.

In an embodiment, the FSM circuit transitions from the start state to the half-bit rise state in response to detecting a half-bit rise and not detecting a full-bit rise or a full-bit fall.

In an embodiment, the FSM circuit transitions from the half-bit rise state to the bit "1" detected fall state in response to detecting a half-bit fall. A decoded output of the FSM circuit is a "1."

In an embodiment, the FSM circuit transitions from the start state to the half-bit fall state in response to detecting a half-bit fall and not detecting a full-bit rise or a full-bit fall.

In an embodiment, the FSM circuit transitions from the half-bit fall state to the bit "1" detected rise state in response to detecting a half-bit rise, wherein the decoded output of the FSM circuit is a "1."

In an embodiment, the FSM circuit transition from the half-bit rise state to the bit "0" detected state in response to not detecting a half-bit fall and detecting a full-bit rise.

In an embodiment, the FSM circuit transitions from the half-bit fall state to the bit "0" detected state in response to detecting a full-bit fall and not detecting a half-bit rise.

In an embodiment, the FSM circuit transitions from the start state to the bit "0" detected state in response to detecting a full-bit rise and not detecting a full-bit fall or detecting a full-bit fall and not detecting a full-bit fall.

In an embodiment, the decoded output of the FSM circuit at bit "0" detected state is a "0".

A second aspect relates to a method for decoding a biphase mark coding (BMC) encoded signal. The method includes generating, by a matched filter, a first response and a second response to the BMC encoded signal, the first response and second response operating, respectively, at a half clock period and a full clock period of the BMC encoded signal; generating, by a detector circuit coupled to the matched filter, an output signal based on detecting a half-bit rise for the first response, a half-bit fall for the first response, a full-bit rise for the second response, or a full-bit fall for the second response; and decoding the BMC encoded signal, by a finite state machine (FSM) circuit, based on the output signal of the detector circuit.

In a first implementation form of the method according to the second aspect as such, the generating the first response and the second response includes generating the first response by a first matched filter matching pulses on the half clock period; and generating the second response by a second matched filter matching pulses on the full clock period.

In a second implementation form of the method according to the second aspect as such or any preceding implementation form of the second aspect, generating the output signal includes generating, by a first rising detector circuit, a first output corresponding to a half-bit rise based on determining whether the first response has a rising transition and crossing a first threshold at the half clock period; generating, by a first falling detector circuit, a second output corresponding to a half-bit fall based on determining whether the first response has a falling transition and crossing a second threshold at the half clock period; generating, by a second rising detector circuit, a third output corresponding to the full-bit rise based on determining whether the second response has a rising transition and crossing a third threshold at the full clock period; and generating, by a second falling detector circuit, a fourth output corresponding to the full-bit fall based on determining whether the second response has a falling transition and crossing a fourth threshold at the full clock period.

In a third implementation form of the method according to the second aspect as such or any preceding implementation form of the second aspect, the decoding the BMC encoded signal includes decoding the BMC encoded signal based on the first output, the second output, the third output, the fourth output, or a combination thereof.

In a fourth implementation form of the method according to the second aspect as such or any preceding implementation form of the second aspect, the matched filter, the detector circuit, and the FSM circuit operate asynchronously.

In a fifth implementation form of the method according to the second aspect as such or any preceding implementation form of the second aspect, the FSM circuit is a six-state FSM circuit.

In a sixth implementation form of the method according to the second aspect as such or any preceding implementation form of the second aspect, the FSM circuit includes a start state, a half-bit rise state, a bit "1" detected fall state, a half-bit fall state, a bit "1" detected rise state, and a bit "0" detected state.

In an embodiment, the FSM circuit transitions from the start state to the half-bit rise state in response to detecting a half-bit rise and not detecting a full-bit rise or a full-bit fall.

In an embodiment, the FSM circuit transitions from the half-bit rise state to the bit "1" detected fall state in response to detecting a half-bit fall. A decoded output of the FSM circuit is a "1."

In an embodiment, the FSM circuit transitions from the start state to the half-bit fall state in response to detecting a half-bit fall and not detecting a full-bit rise or a full-bit fall.

In an embodiment, the FSM circuit transitions from the half-bit fall state to the bit "1" detected rise state in response to detecting a half-bit rise, wherein the decoded output of the FSM circuit is a "1."

In an embodiment, the FSM circuit transition from the half-bit rise state to the bit "0" detected state in response to not detecting a half-bit fall and detecting a full-bit rise.

In an embodiment, the FSM circuit transitions from the half-bit fall state to the bit "0" detected state in response to detecting a full-bit fall and not detecting a half-bit rise.

In an embodiment, the FSM circuit transitions from the start state to the bit "0" detected state in response to detecting a full-bit rise and not detecting a full-bit fall or detecting a full-bit fall and not detecting a full-bit fall.

In an embodiment, the decoded output of the FSM circuit at bit "0" detected state is a "0".

A third aspect relates to an amplitude shift keying (ASK) demodulator for decoding a biphase mark coding (BMC) encoded signal. The ASK demodulator includes a matched filter, a detector circuit, and a finite state machine circuit. The matched filter is configured to generate a first response and a second response to the BMC encoded signal. The first response and second response operate, respectively, at a half clock period and a full clock period of the BMC encoded signal. The detector circuit is coupled to an output of the matched filter, and is configured to generate an output signal based on detecting a half-bit rise for the first response, a half-bit fall for the first response, a full-bit rise for the second response, or a full-bit fall for the second response. The FSM circuit is configured to decode the BMC encoded signal based on the output signal of the detector circuit.

In a first implementation form of the ASK demodulator according to the third aspect as such, the ASK demodulator further includes a data slicer coupled to an input of the matching filter. The data slicer is configured to determine whether an input to the data slicer is above or below a threshold; and generate a positive binary value in response to detecting the input to the data slicer being above the threshold, and a negative binary value in response to detecting the input to the data slicer being below the threshold.

In a second implementation form of the ASK demodulator according to the third aspect as such or any preceding implementation form of the third aspect, the detector circuit includes a first rising detector circuit configured to generate a first output corresponding to a half-bit rise based on determining whether the first response has a rising transition and crossing a first threshold at the half clock period; a first falling detector circuit configured to generate a second output corresponding to a half-bit fall based on determining whether the first response has a falling transition and crossing a second threshold at the half clock period; a second rising detector circuit configured to generate a third output corresponding to the full-bit rise based on determining whether the second response has a rising transition and crossing a third threshold at the full clock period; and a third falling detector circuit configured to generate a fourth output corresponding to the full-bit fall based on determining whether the second response has a falling transition and crossing a fourth threshold at the full clock period.

In a third implementation form of the ASK demodulator according to the third aspect as such or any preceding implementation form of the third aspect, the FSM circuit is configured to decode the BMC encoded signal comprises decoding the BMC encoded signal based on the first output, the second output, the third output, the fourth output, or a combination thereof.

In a fourth implementation form of the ASK demodulator according to the third aspect as such or any preceding implementation form of the third aspect, the FSM circuit is a six-state FSM circuit.

In a fifth implementation form of the ASK demodulator according to the third aspect as such or any preceding implementation form of the third aspect, the circuit includes a start state, a half-bit rise state, a bit "1" detected fall state, a half-bit fall state, a bit "1" detected rise state, and a bit "0" detected state.

In an embodiment, the FSM circuit transitions from the start state to the half-bit rise state in response to detecting a half-bit rise and not detecting a full-bit rise or a full-bit fall.

In an embodiment, the FSM circuit transitions from the half-bit rise state to the bit "1" detected fall state in response to detecting a half-bit fall. A decoded output of the FSM circuit is a "1."

In an embodiment, the FSM circuit transitions from the start state to the half-bit fall state in response to detecting a half-bit fall and not detecting a full-bit rise or a full-bit fall.

In an embodiment, the FSM circuit transitions from the half-bit fall state to the bit "1" detected rise state in response to detecting a half-bit rise, wherein the decoded output of the FSM circuit is a "1."

In an embodiment, the FSM circuit transition from the half-bit rise state to the bit "0" detected state in response to not detecting a half-bit fall and detecting a full-bit rise.

In an embodiment, the FSM circuit transitions from the half-bit fall state to the bit "0" detected state in response to detecting a full-bit fall and not detecting a half-bit rise.

In an embodiment, the FSM circuit transitions from the start state to the bit "0" detected state in response to detecting a full-bit rise and not detecting a full-bit fall or detecting a full-bit fall and not detecting a full-bit fall.

In an embodiment, the decoded output of the FSM circuit at bit "0" detected state is a "0".

Embodiments can be implemented in hardware, software, or in any combination thereof.

BRIEF DESCRIPTION OF THE DRAWINGS

For a more complete understanding of the present disclosure and the advantages thereof, reference is now made to the following descriptions taken in conjunction with the accompanying drawings, in which:

FIG. 12 is a corresponding state transition table 1200, for the FSM of FIG. 11;

DETAILED DESCRIPTION OF ILLUSTRATIVE EMBODIMENTS

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of a Qi-compliant wireless power system, Biphase Mark Coding (BMC), and amplitude-shift keying (ASK) modulation, it should also be appreciated that these inventive aspects may also be applicable to any other type of amplitude modulation (AM) scheme or similar encoding schemes. Further, embodiments of the present invention may operate without complying with the Qi standard.

In embodiments, a decoding circuit comprises matched filters, rise and fall detector circuits, and a finite state machine. The decoding circuit asynchronously detects a "0" or "1" value for a signal encoded based on biphase mark coding (BMC). In embodiments, the signal is an encoded data stream communicated from a power receiver device to a power transmitting device. In embodiments, the data stream is communicated using ASK modulation. In embodiments, the finite state machine is a six-state finite state machine. In embodiments, the decoding circuit does not require closed-loop circuits (e.g., a delay-locked loop (DLL), phase-locked loop (PLL), etc.) for time recovery.

As noted, a receiving device may use ASK modulation to communicate with a transmitting device in a wireless power system. Thus, the receiving device can use ASK modulation to, for example, request a power transfer adjustment from the transmitting device.

Figure 1:
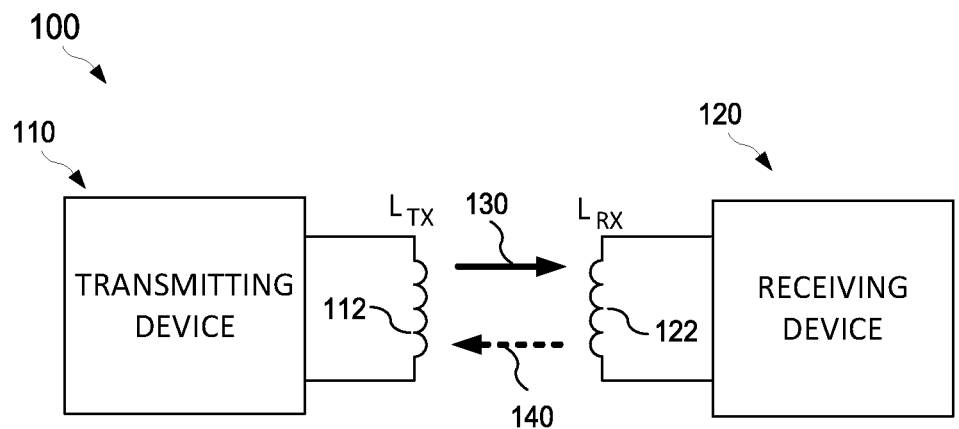
FIG. 1 is an embodiment wireless power system.

FIG. 1 illustrates an embodiment wireless power system 100. The wireless power system 100 may also be referred to as a wireless charging system. The wireless power system 100 includes a transmitting device 110 and a receiving device 120, which may (or may not) be arranged as shown. The transmitting device 110 generates and transmits wireless energy 130 to the receiving device 120.

The transmitting device 110 may be a base station, for example, a charging pad, which provides inductive power to the receiving device 120. The receiving device 120 may be, for example, a mobile device, a tablet, a cellular phone, a wearable communications device (e.g., a smartwatch), a digital pen, a wireless headphone, a toothbrush, a sensor, internet of things (IoT) device, or the like. The receiving device 120 is, essentially, the consumer of inductive power.

The transmitting device 110 includes transmitter coils 112 ($L_{TX}$). The receiving device 120 includes receiver coils 122 ($L_{RX}$). Each coil, or winding, may be a loop antenna or a magnetic antenna. The coils may have a physical core (e.g., ferrite core) or an air core. The coils may be implemented as an antenna strip or using a Litz wire. The resonant frequency of each coil is based on the shape and size of the looping wire or coil. In some embodiments, additional capacitance and inductance may be added to each coil to create a resonant structure at the desired resonant operating frequency.

In embodiments, the wireless energy 130 is transmitted from the transmitting device 110 to the receiving device 120 using resonant inductive coupling between the transmitter coils 112 and the receiver coils 122. The receiving device 120 may use the power to charge rechargeable batteries or to power the components within the receiving device 120 directly.

Several interface standards have been developed to standardize wireless power transfer and related functions. One such interface standard is Qi, which is promoted by the Wireless Power Consortium (WPC). Qi and other similar standardized protocols may be used to define the communication interface for controlling the power transfer in the wireless power system 100. For instance, the receiving device 120 may request, from the transmitting device 110, a change (e.g., an increase, a decrease, a pause, etc.) related to the transferred wireless energy 130.

Figure 2:
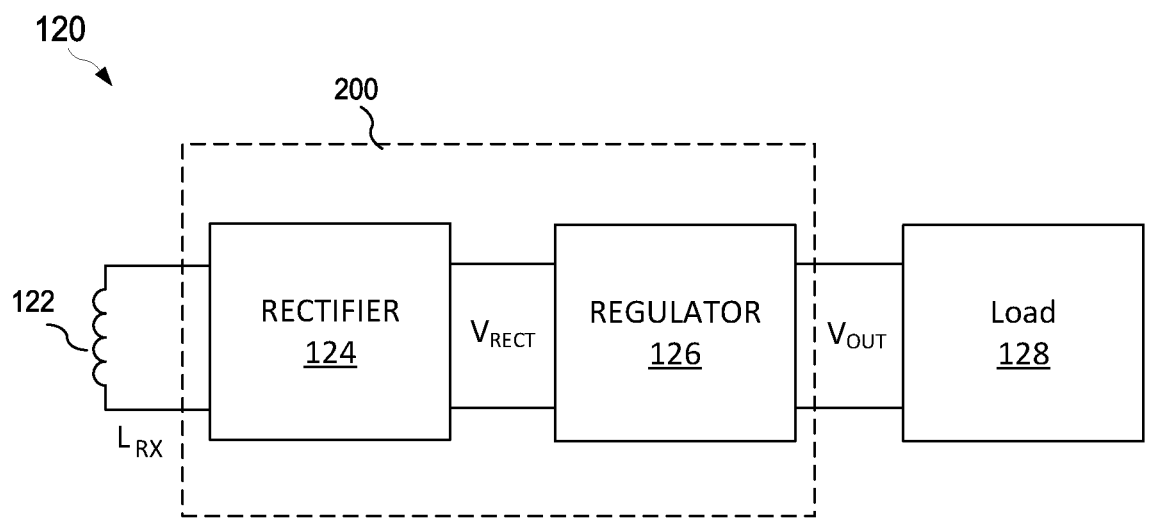
FIG. 2 is an embodiment receiving device.

FIG. 2 illustrates an embodiment receiving device 120. As shown, the receiving device 120 includes the receiver coils 122, a power charging circuit 200, and a load 128. The power charging circuit 200 includes a rectifier 124 and a regulator 126. The receiving device 120 may include additional components not depicted in FIG. 2, such as long-term storage (e.g., non-volatile memory, etc.), a non-transitory computer-readable medium, one or more antenna elements, drivers, demodulators, modulators, filter circuits, and impedance matching circuits.

The rectifier 124 converts the alternating current (AC) voltage, at the receiver coils 122, to a direct current (DC) voltage. The rectifier 124 may be any type of rectifier, such as a low-impedance synchronous rectifier having full-wave or half-wave rectification, or an active rectifier. In embodiments, the rectifier 124 may be a bridge rectifier; however, other types of rectifiers are also contemplated.

The regulator 126 receives a voltage ($V_{RECT}$) from the rectifier 124 and then regulates that voltage to maintain a constant output voltage ($V_{OUT}$) at load 128. The regulator 126 may be any type of voltage regulator, such as a linear regulator (e.g., low drop-out (LDO) linear regulator). In some embodiments, the rectifier 124 and the regulator 126 may be part of a switched-mode power supply (SMPS) circuit.

As shown, load 128 is the primary benefactor of the transferred wireless energy 130. The load 128 may be a charge storage device, such as a battery. For instance, load 128 may be a battery of a cellular phone or a smartwatch. As an example, the transmitting device 110 may be a charging pad, and a smartwatch may be placed on the charging pad. The charging pad transfers wireless power to the battery of the smartwatch without the need for interconnecting cables between the two devices.

Figure 3:
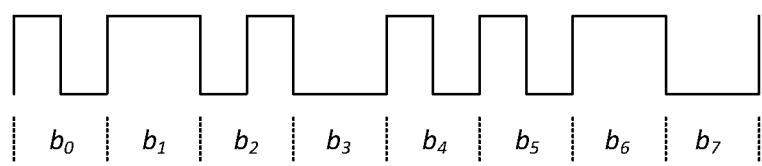
FIG. 3 is an exemplary ASK message byte encoded using Biphase Mark Coding (BMC)

FIG. 3 illustrates an exemplary ASK message byte 300 encoded using Biphase Mark Coding (BMC). ASK message byte 300 may be part of an ASK message packet transmitted using ASK modulation, for example, by switching a capacitive or resistive load on the receiving device 120, affecting the current and voltage of transmitter coils 112 of the transmitting device 110. In embodiments, a preamble immediately precedes ASK message byte 300. In embodiments, a parity bit and a stop bit immediately follow ASK message byte 300.

Generally, a digital modulation scheme represents digital data using a finite number of distinct signals. ASK modulation refers to a modulation scheme in which digital data is represented as variations in the amplitude of a carrier wave.

Biphase Mark Coding (BMC) is a version of Manchester Coding—each being a line code in digital frequency modulation. In the traditional Manchester-encoded signal, values of "0" and "1" are encoded onto, respectively, falling and rising edges of each clock period (see, e.g., IEEE 802.4). In contrast, in the BMC-encoded signal per the Qi standard, which shows a systematic edge at the beginning of each clock period, values of "0" and "1" are associated with an absence or presence, respectively, of an intermediate polarity transition within each clock period.

Thus, in a message encoded using BMC, the value of a bit is determined based on an occurrence or non-occurrence of a polarity transition within a half clock cycle. The value of the bit is determined to be a "1" if the signal polarity changes at the half clock cycle and the value of the bit is determined to be a "0" if the signal polarity remains the same at the half clock cycle. As such, to decode a signal encoded using BMC encoding, a determination is made to an occurrence of an intermediate transition (i.e., within the half clock cycle) of the signal polarity (either from high to low or low to high).

ASK message byte 300 includes 8 bits ($b_0$-$b_7$). Decoding ASK message byte 300 based on the BMC line code, results in bits $b_0$, $b_2$, $b_4$, and $b_5$ having a value of "1," and bits $b_1$, $b_3$, $b_6$, and $b_7$ having a value of "0". Thus, ASK message byte 300 corresponds to a value of "10101100" when decoded based on the BMC encoding technique.

As previously noted, the receiving device 120 can transmit identification and control data to the transmitting device 110 to, for example, adjust power requirements and control the transferred wireless energy 130.

Conventional solutions to decode a message encoded based on BMC encoding are generally complex and costly, with sophisticated timing control circuits, high-level sensitivity detection circuits, and accurate time synchronization circuits for measuring signal amplitudes and edge detections. Embodiments of this disclosure provide cheaper, more efficient, and simpler solutions to existing methods and circuits. In particular, the disclosure provides solutions for the symbol decoding problem (i.e., detecting an edge in the middle of the clock period), the bit decision (i.e., recognizing if the provided symbol corresponds to a "0" or a "1"), and asynchronous timing recovery (i.e., without employing a synchronization circuit, such as a phase-locked loop (PLL) or a delay-locked loop (DLL) circuit) when decoding a message encoded based on the BMC encoding technique.

Figure 4:
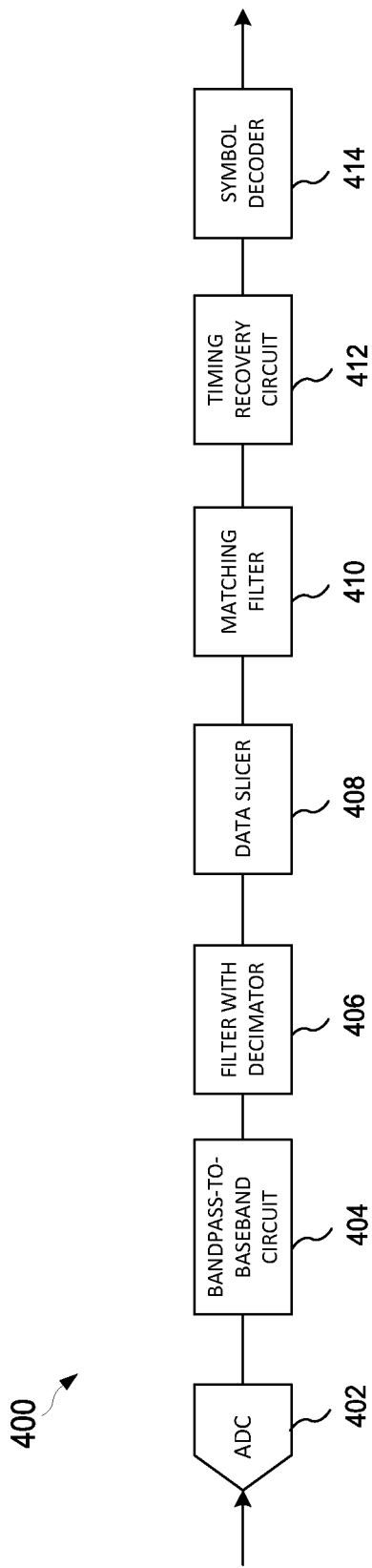
FIG. 4 is a block diagram of a typical ASK demodulator.

FIG. 4 illustrates a block diagram of a typical ASK demodulator 400, which includes an analog-to-digital converter (ADC) 402, a bandpass-to-baseband circuit 404, a filter with decimator 406, a data slicer 408, a matched filter 410, a timing recovery circuit 412, and a symbol decoder circuit 414.

The input to the ASK demodulator 400 is a modulated stream received at, for example, the transmitter coils 112 of the transmitting device 110 in a Qi-compliant communication. The output of the ASK demodulator 400 is a demodulated bit stream.

ADC 402 receives the modulated samples from the primary coil of the device and converts the analog signal to a digital signal. The digital signal is fed to the bandpass-to-baseband circuit 404.

During modulation, a complex baseband signal, which cannot be transmitted, is transformed into a bandpass signal, which can be transmitted. The bandpass-to-baseband circuit 404 of the ASK demodulator 400 shifts the bandpass signal centered on $f_c$, received from the ADC 402 and communicated, for example, from the receiving device 120, to a baseband signal centered on 0 Hertz (Hz) and a bandpass signal centered on $2f_c$.

The filter with decimator 406 removes high-frequency artifacts, such as the bandpass signal centered on $2f_c$, and reduces the number of samples to be demodulated.

Data slicer 408 determines, based on a threshold parameter, whether an input to the data slicer 408 is above or below the threshold. If the input to data slicer 408 is above the threshold, the output is "+1," and if the input to the data slicer 408 is below the threshold, the output is "−1," or vice versa. In embodiments, data slicer 408 comprises one or more comparator circuits.

Matched filter 410 applies matched filtering, where an optimum filter (e.g., correlation filter) is applied to the output of data slicer 408. Generally, matched filters process a waveform (e.g., the output of data slicer 408) by correlating with a noise-free replica of the emitted signal.

The timing recovery circuit 412 recovers the source clock to assign the correct timing on the incoming waveform (i.e., output of matched filter 410). The timing recovery circuit 412 is typically implemented using closed-loop circuits that act on the source clock, in terms of phase shift (e.g., delay-locked loop (DLL) circuit) or both phase and period variation (e.g., phase-locked loop (PLL) circuit), to ensure its proper synchronization with the output of matched filter 410.

The symbol decoder circuit 414 decodes the signal based on the specific encoding/decoding scheme used to communicate within the wireless power system and outputs a corresponding bit stream.

Figure 5:
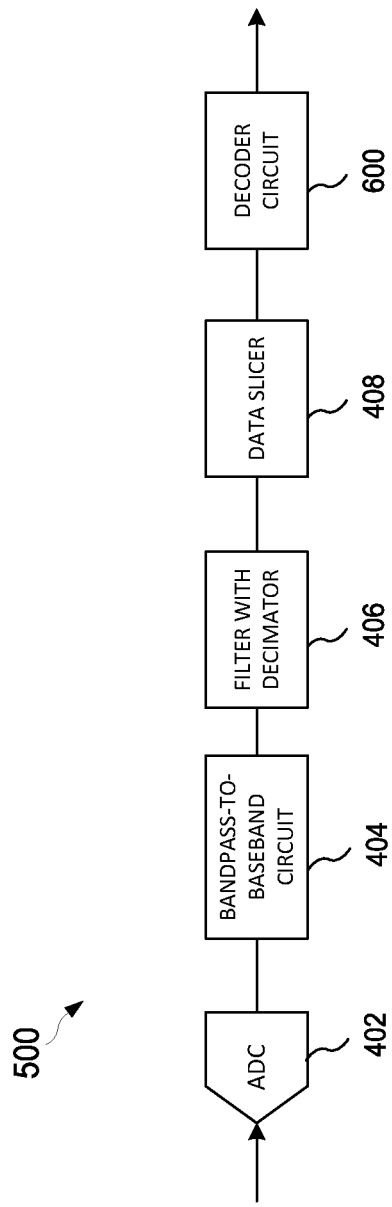
FIG. 5 is a block diagram of an embodiment ASK demodulator.
Figure 6:
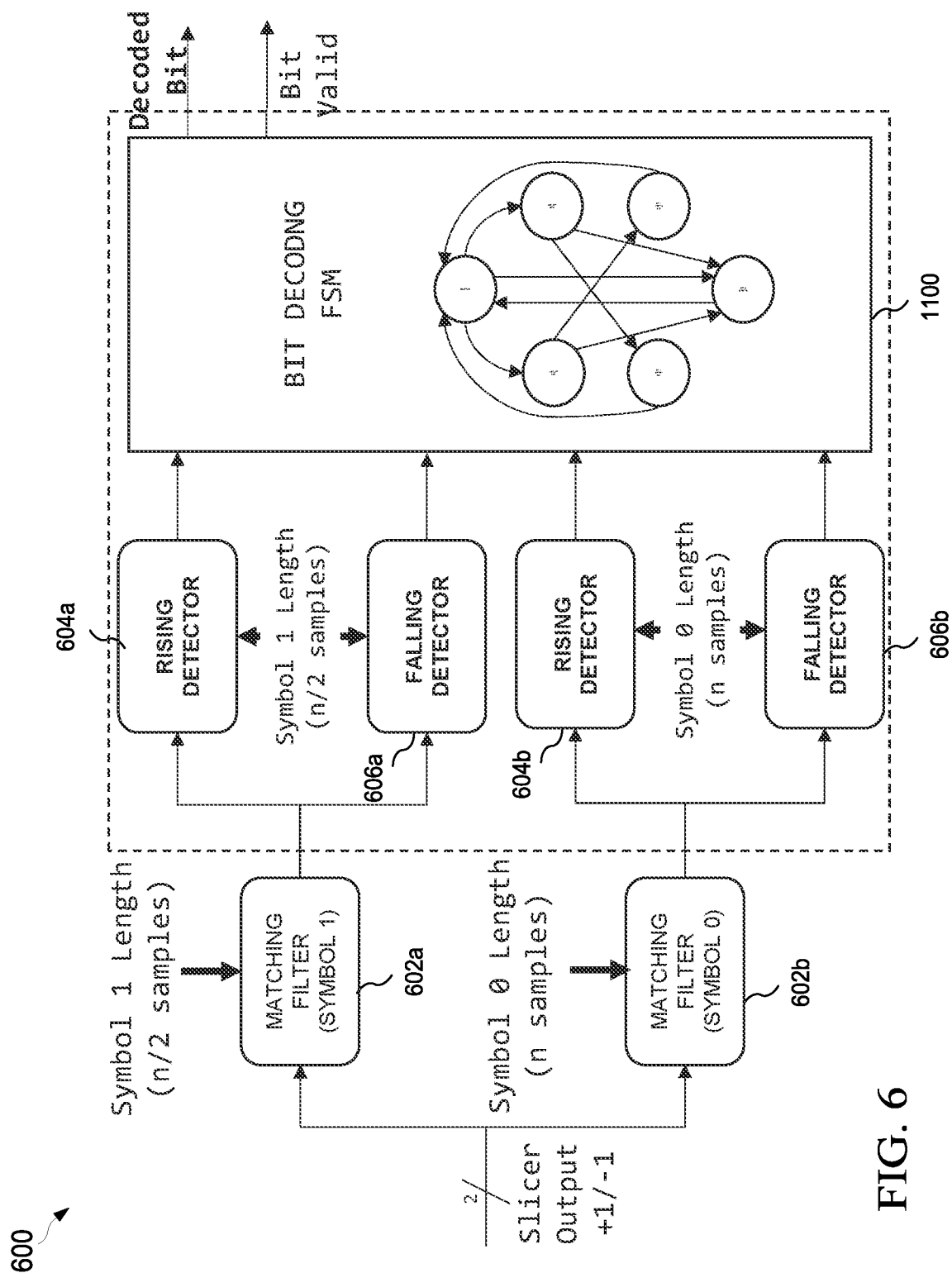
FIG. 6 is a block diagram of an embodiment decoder circuit used in an ASK demodulator for decoding a BMC encoded signal.

FIG. 5 illustrates a block diagram of an embodiment ASK demodulator 500, which includes the ADC 402, the bandpass-to-baseband circuit 404, the filter with decimator 406, the data slicer 408, and decoder circuit 600, as further detailed in FIG. 6. As shown, the decoder circuit 600 replaces the conventional matched filter 410, timing recovery circuit 412, and symbol decoder circuit 414 in the ASK demodulator 400, with a cheaper and less complex circuit that operates asynchronously for decoding the incoming signal to an ASK demodulator.

FIG. 6 illustrates a block diagram of an embodiment decoder circuit 600 used in an ASK demodulator for decoding a BMC encoded signal. Decoder circuit 600 is an asynchronous circuit that includes a pair of matched filters 602a-b, a pair of rising detector circuits 604a-b, a pair of falling detector circuits 606a-b, and a finite state machine circuit 1100 (as further detailed below), which may (or may not) be arranged as shown. Further, decoder circuit 600 may include additional components not shown, such as a dedicated controller circuit, memory, and the like.

In embodiments, the first input to each matched filter 602a-b is provided by data slicer 408 of the ASK demodulator 500. In embodiments, the input to the matched filters 602a-b is associated with a Qi-compliant bipolar square wave, having a maximum frequency of 2±4% kHz, corresponding to that of the clock.

In embodiments, matched filters 602a-b reject noise at the input signal. For example, matched filters 602a-b can reject noise with an amplitude of 500 mV for an input signal with a frequency of 160 kHz, $V_H$=24 Volts (V), and $V_L$=23.5 V.

In embodiments, matched filters 602a-b include an accumulator logic. In embodiments, matched filters 602a-b use a first-in-first-out (FIFO) unit to store samples.

In embodiments, each of matched filter 602a and 602b receive as a first input, an output signal from data slicer 408. Matched filters 602a-b correlate a known delayed signal (i.e., template) with an unknown signal (i.e., output of data slicer 408) to detect the presence of a template in the unknown signal (i.e., output of data slicer 408). Thus, matched filters 602a-b maximize the signal-to-noise ratio (SNR) of the signal received from data slicer 408, where the waveform template (thus spectrum) of the signal is assumed to be known a priori.

In an embodiment, a second input to matched filter 602a is a binary representation of the length of Symbol 1. Symbol 1 is a signal with a length of n/2, where n corresponds to the number of samples generated by ADC 402 for a single clock cycle. In embodiments, the second input to matched filter 602a is generated by a controller of the transmitting device 110. In embodiments, the second input to matched filter 602a is stored in a memory of transmitting device 110 and communicated to matched filter 602a from the controller.

In an embodiment, a second input to matched filter 602b is a binary representation of the length of Symbol 0. Symbol 0 is a signal with a length of n, where n corresponds to the number of samples generated by ADC 402 for a single clock cycle. In embodiments, the second input to matched filter 602b is generated by a controller of the transmitting device 110. In embodiments, the second input to matched filter 602b is stored in the memory of transmitting device 110 and communicated to matched filter 602b from the controller.

Generally, given an input signal s(t), the pulse response of its matched filter corresponds with the equation: h(t)=s(T−t), where T is the data rate period. Thus, the output of a matched filter, when the input is a Dirac delta δ(t), is a time-reversed signal having the same waveform of the input signal s(t) and a delay equal to the data rate period. In embodiments where the sampling is synchronized with the data and the correlator response, the correlator's sampled value is maximized, allowing for increased bit recognition.

Figure 7:
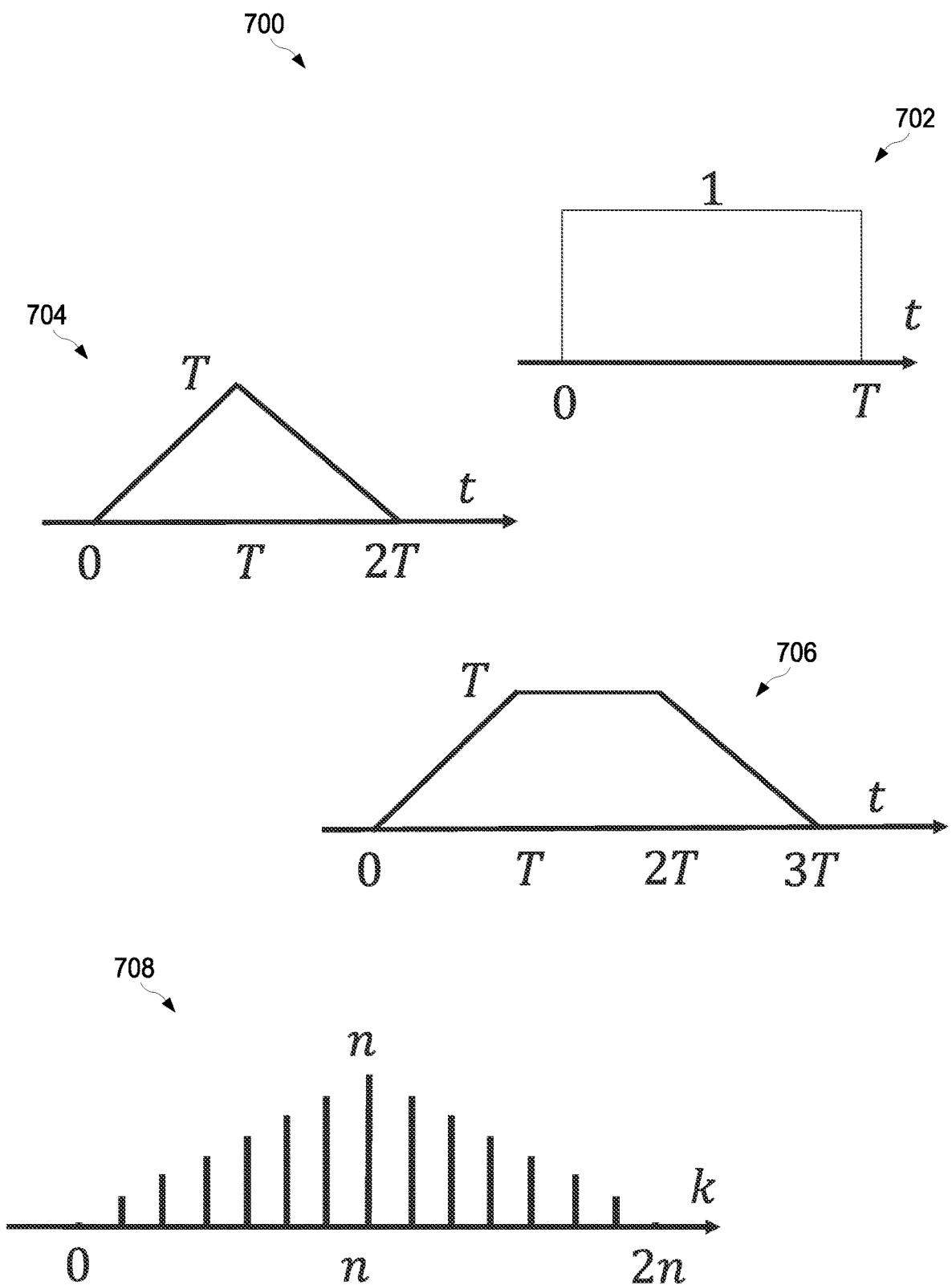
FIG. 7 is a diagram of matched filter response to a continuous-time rectangular pulse.

FIG. 7 illustrates a diagram 700 of matched filter response to a continuous-time rectangular pulse 702. The rectangular pulse 702 has a non-null amplitude equal to "1" only within the time interval t∈[0,T]. The pulse response of a matched filter corresponds to itself: $s(T-t)=p_{0,T}(T-t)=p_{-T,0}(t-T)=p_{T-T,0+T}(t)=p_{0,T}(t)$.

The response of a matched filter to a rectangular pulse $p_{0,T}(t)*p_{0,T}(t)$ is a triangular pulse 704. Triangular pulse 704 is an output signal of a rectangular function of the matched filter that peaks at time T, with a duration of 2T.

In an evaluation of the response associated with a sequence of rectangular pulses, linearity can be exploited: $[p_{0,T}(t)+p_{T,2T}(t)]*p_{0,T}(t)=p_{0,T}(t)*p_{0,T}(t)+p_{T,2T}(t)*p_{0,T}(t)$, which is represented as the curve 706.

In a discrete-time scenario with sampling period $T_{sampling}$, a matching filter can be implemented with a moving average-like accumulator on n-input signal samples: $y[k]=\Sigma_{i=1}^{n} x[k-i]$, where $n=T/T_{sampling}$ is chosen to be equal to the rectangular pulse discrete-time duration. Such a response is represented as curve 708.

Matched filter 602a is configured to match an input rectangular pulse signal on a half clock period of the signal. The output of matched filter 602a is coupled to an input of each of the rising detector circuit 604a and falling detector circuit 606a, which are then fed to the finite state machine circuit 1100 to decode the corresponding bits, as further detailed hereinbelow.

Matched filter 602b is configured to match an input rectangular pulse on a whole clock period of the signal. The output of the matched filter 602b is coupled to an input of each of the rising detector circuit 604b and falling detector circuit 606b, which are then fed to the finite state machine circuit 1100 to decode the corresponding bits.

FIGS. 8a-d illustrate embodiment responses from matched filter 602a to inputs received from data slicer 408. FIGS. 9a-c illustrate embodiment responses from matched filter 602b to inputs received from data slicer 408.

In these figures, for illustrative purposes and to simplify the discussion, a clock period refers to a duration of time T corresponding to the period of the incoming encoded input signal. Further, a clock semi-period refers to a duration of time T/2 corresponding to a half-period of the incoming encoded input signal. However, using these terms does not imply that a circuit requires, for example, a closed-loop circuit to detect the signal period. Specifically, embodiments of the disclosure advantageously provide an asynchronous decoder circuit, looking to the waveform of the matched filters 602a and 602b and their time evolutions.

Further, the input signals are illustrated as having a positive non-null amplitude (e.g., +1) and a negative non-null amplitude (e.g., −1) received by a corresponding matching filter from, for example, data slicer 408. In the figures, t is a continuous time variable, T refers to a duration of a full clock period, n refers to the amplitude of the triangular pulse corresponding to the matched filter 602b response, which is also equal to the number of discrete-time samples within a full clock period, and n/2, refers to the amplitude of the triangular pulse corresponding to the matched filter 602a response, which is also equal to the half the number of discrete-time samples within a full clock period.

Figure 8A:
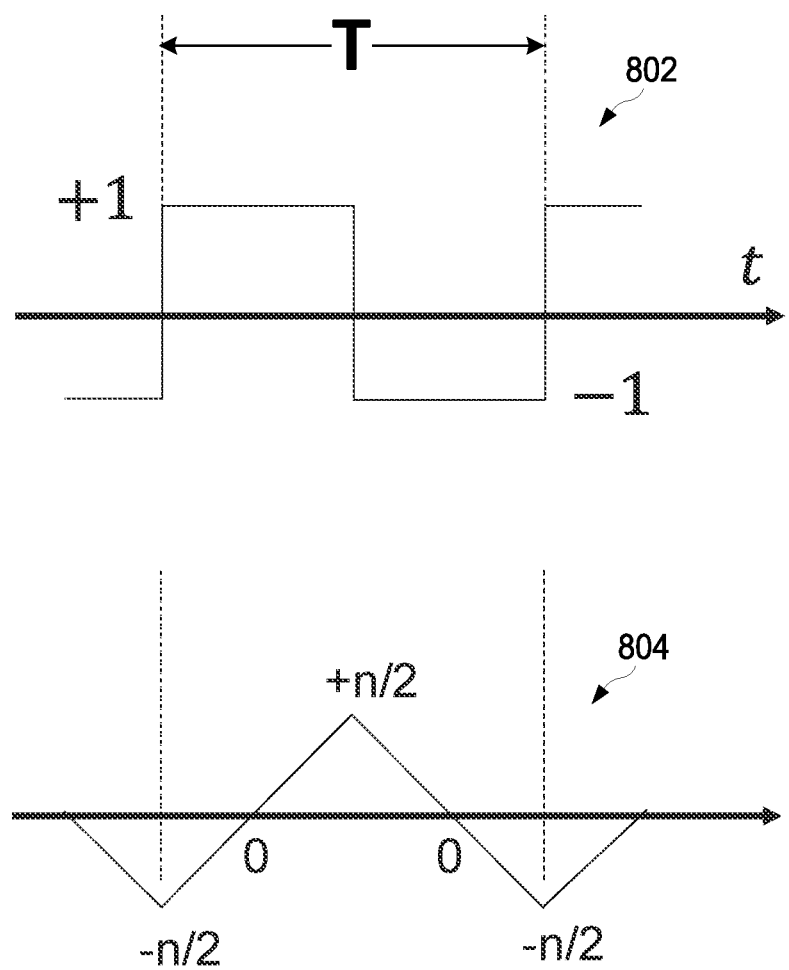
FIGS. 8a-d are embodiment responses from a matched filter to inputs received from a data slicer.
Figure 9A:
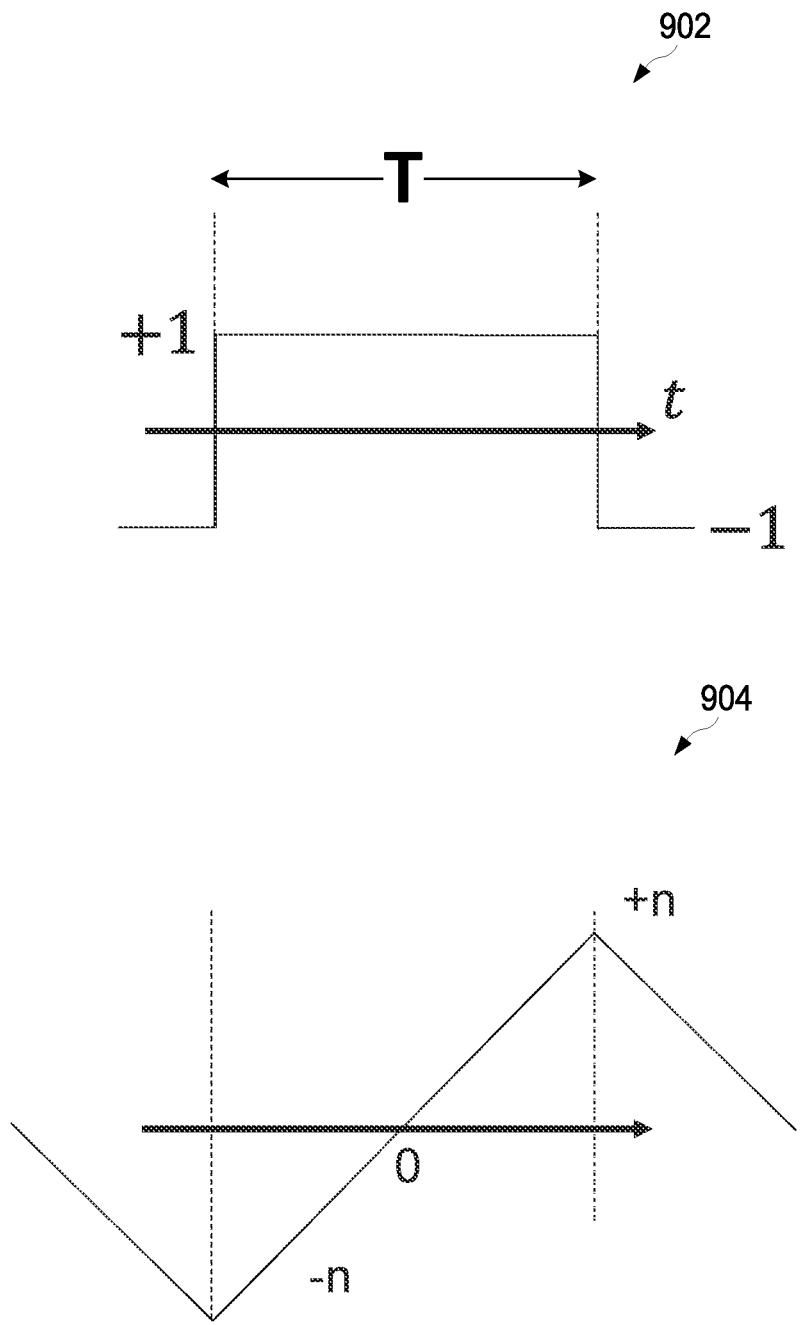
FIGS. 9a-c are embodiment responses from a matched filter to inputs received from a data slicer.
Figure 9B:
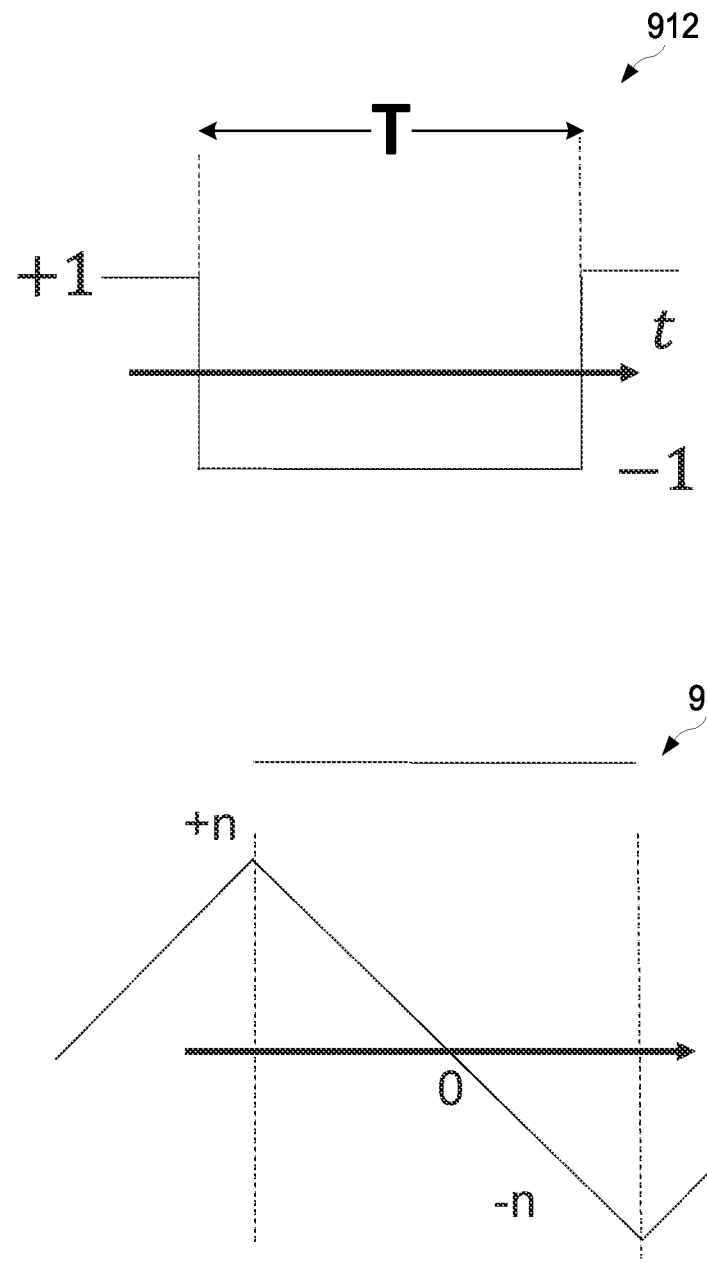
Figure 9C:
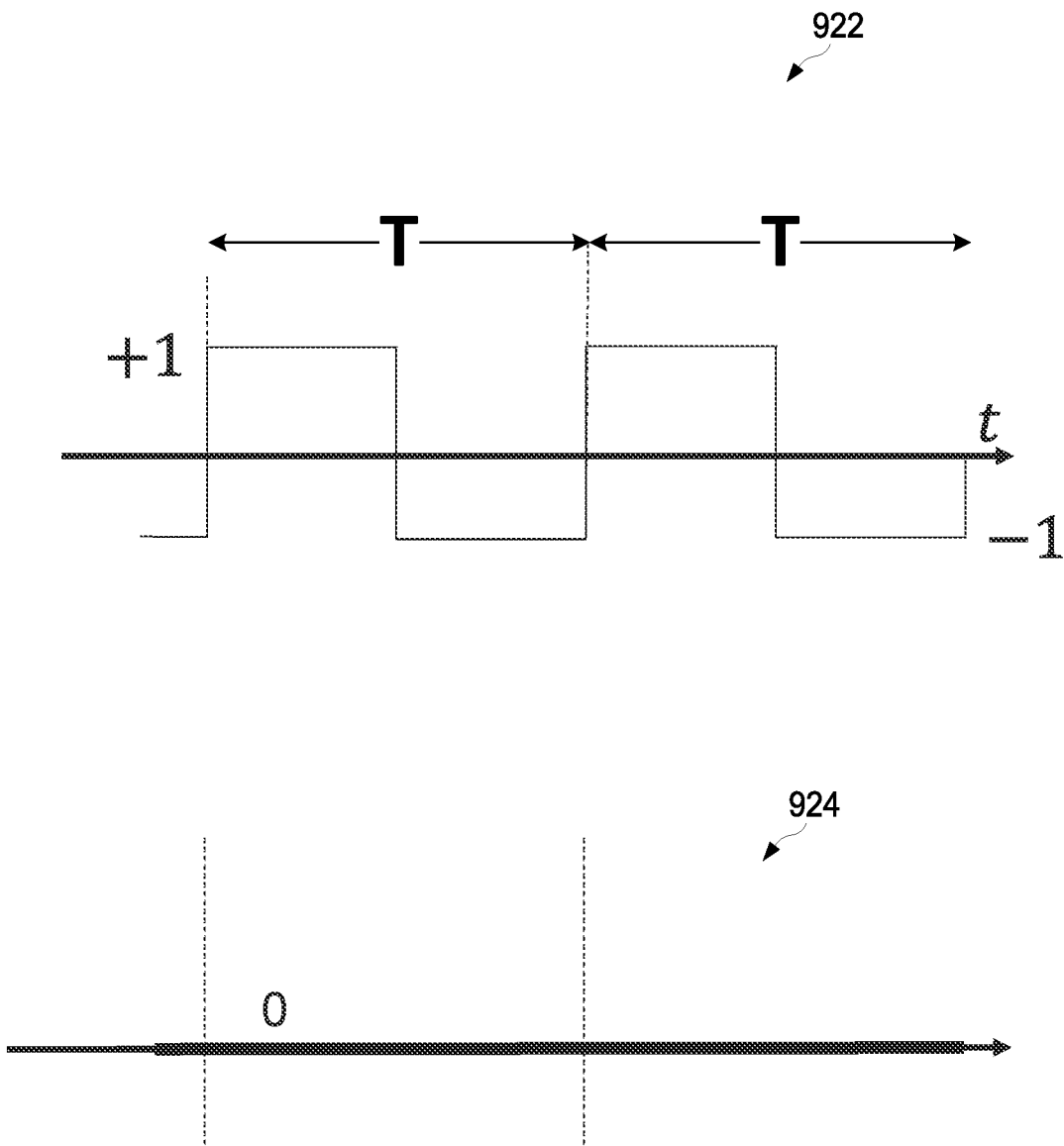

FIG. 8a illustrates response 804 of matched filter 602a, operating on a clock semi-period (i.e., T/2), to input 802, which is a square-wave pulse within the clock period (T) with a polarity transition from a "+1" to a "−1" at the clock semi-period (corresponding to Qi-compliant logical value "1"). Response 804 is a triangular pulse having a minimum value (−n/2) at time $t_0$=0, a first null value at time $t_1$=T/4, a maximum value (+n/2) at time $t_2$=T/2, a second null value at time $t_3$=3T/4, and a minimum value (−n/2) at time $t_4$=T.

Figure 8B:
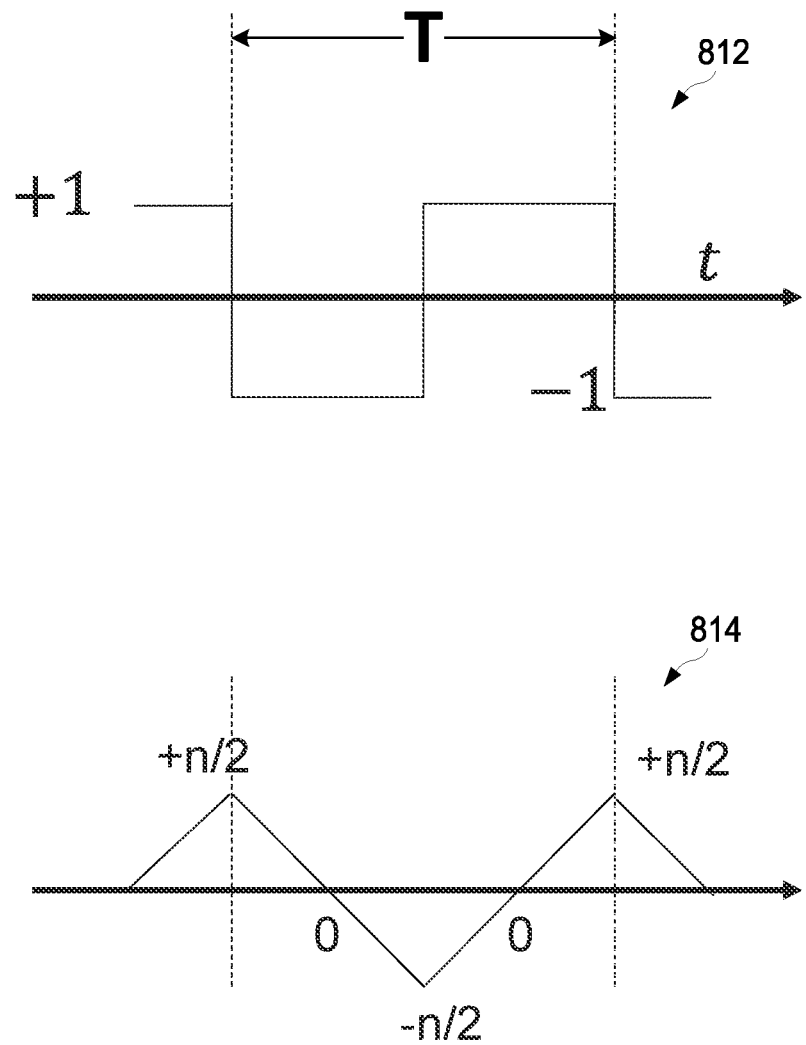

FIG. 8b illustrates response 814 of matched filter 602a, operating on a clock semi-period (T/2), to input 802, which is a square-wave pulse within the clock period (T) with a polarity transition from a "+1" to a "+1" at the clock semi-period (corresponding to Qi-compliant logical value "1"). Response 814 is a triangular pulse having a maximum value (+n/2) at time $t_0$=0, a first null value at time $t_1$=T/4, a minimum value (−n/2) at time $t_2$=T/2, a second null value at time $t_3$=, and a maximum value (+n/2) at time $t_4$=T.

In FIGS. 8a-b, the maximum values (+n/2) and minimum values (−n/2) of the responses 804 and 814 are at times $t_0$=0, $t_2$=T/2, and $t_4$=T (i.e., separated by a half clock period).

Figure 8C:
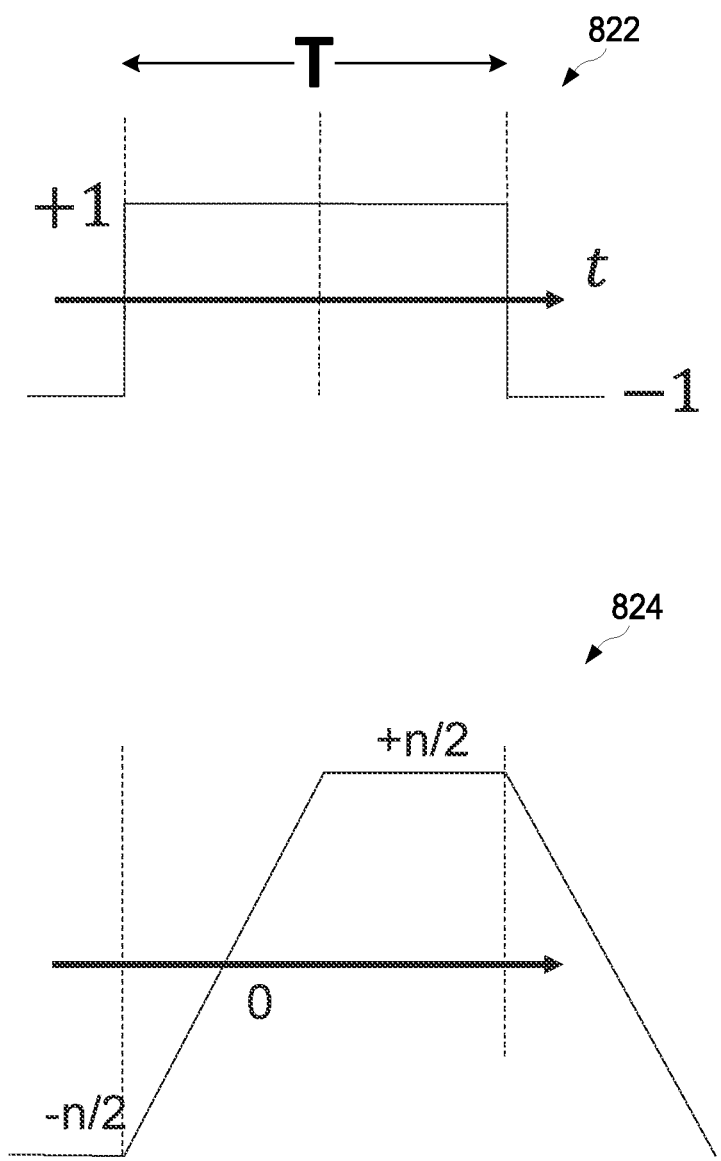

FIG. 8c illustrates response 824 of matched filter 602a, operating on a clock semi-period (T/2), to input 822, which is a rectangular-wave pulse within the clock period (T) and having a "+1" value during the clock period (T). This corresponds to Qi-compliant logical value "0". Response 824 has a minimum value (−n/2) at time $t_0$=0, a first null value at time $t_1$=T/4, and a maximum value (+n/2) from time $t_2$=T/2 to time $t_4$=T.

Figure 8D:
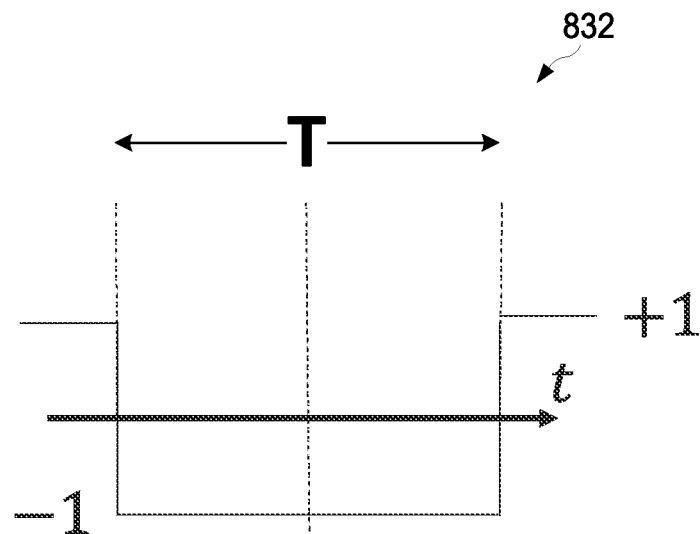
Figure 8D:
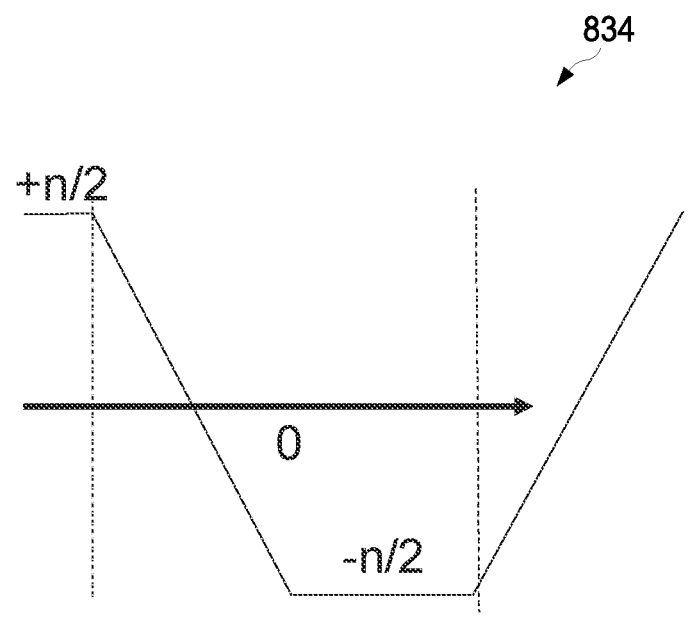

FIG. 8d illustrates response 834 of matched filter 602a, operating on a clock semi-period (T/2), to input 832, which is a rectangular-wave pulse within the clock period (T) and having a "−1" value during the clock period. This corresponds to Qi-compliant logical value "0". Response 834 has a maximum value (+n/2) at time $t_0$=0, a first null value at time $t_1$=T/4, and a minimum value (−n/2) from time $t_2$=T/2 to time $t_4$=T.

In FIGS. 8c-d, the maximum values (+n/2) and minimum values (−n/2) of the responses are at times $t_0$=0, $t_2$=T/2, and $t_4$=T (i.e., separated by a half clock period). In contrast to FIGS. 8a-b, where the response has a maximum value (+n/2) immediately followed by a minimum value (−n/2) (or vice versa), in FIGS. 8c-d, the response remains at the maximum value (+n/2) or minimum value (−n/2) from time $t_2$=T/2 until time $t_4$=T.

FIG. 9a illustrates response 904 of matched filter 602b, operating on a clock period (T), to input 902, which is a rectangular-wave pulse within the clock period (T) and having a "+1" value during the clock period. Response 904 has a minimum value (−n) at time $t_0$=0, a first null value at time $t_1$=T/2, and a maximum value (+n) at time $t_2$=T.

FIG. 9b illustrates response 914 of matched filter 602b, operating on a clock period (T), to input 912, which is a rectangular-wave pulse within the clock period (T) and having a "−1" value during the clock period. Response 914 has a maximum value (+n) at time $t_0$=0, a first null value at time $t_1$=T/2, and a minimum value (−n) at time $t_2$=T.

In FIGS. 9a-b, the maximum values (+n) and minimum values (−n) of responses 904 and 914 are at time $t_0$=0 and time $t_2$=T. The responses 904 and 914 have a null value at time $t_1$=T/2.

FIG. 9c illustrates response 926 of matched filter 602b, operating on a clock period (T), to input 922. Input 922 is shown as a sequence of square wave pulses 924a and 924b, respectively, within the clock period. The first square wave pulse 924a and the second square wave pulse 924b have a polarity transition from "+1" to "−1." Response 926 is a flat null response from time $t_0$=0 to $t_4$=2T. The response of the matched filter 602b to a sequence of consecutive square waves is null, regardless of whether the transition of the square wave is from a high to a low within the clock period (as shown) or from a low to a high (not shown).

Figure 10:
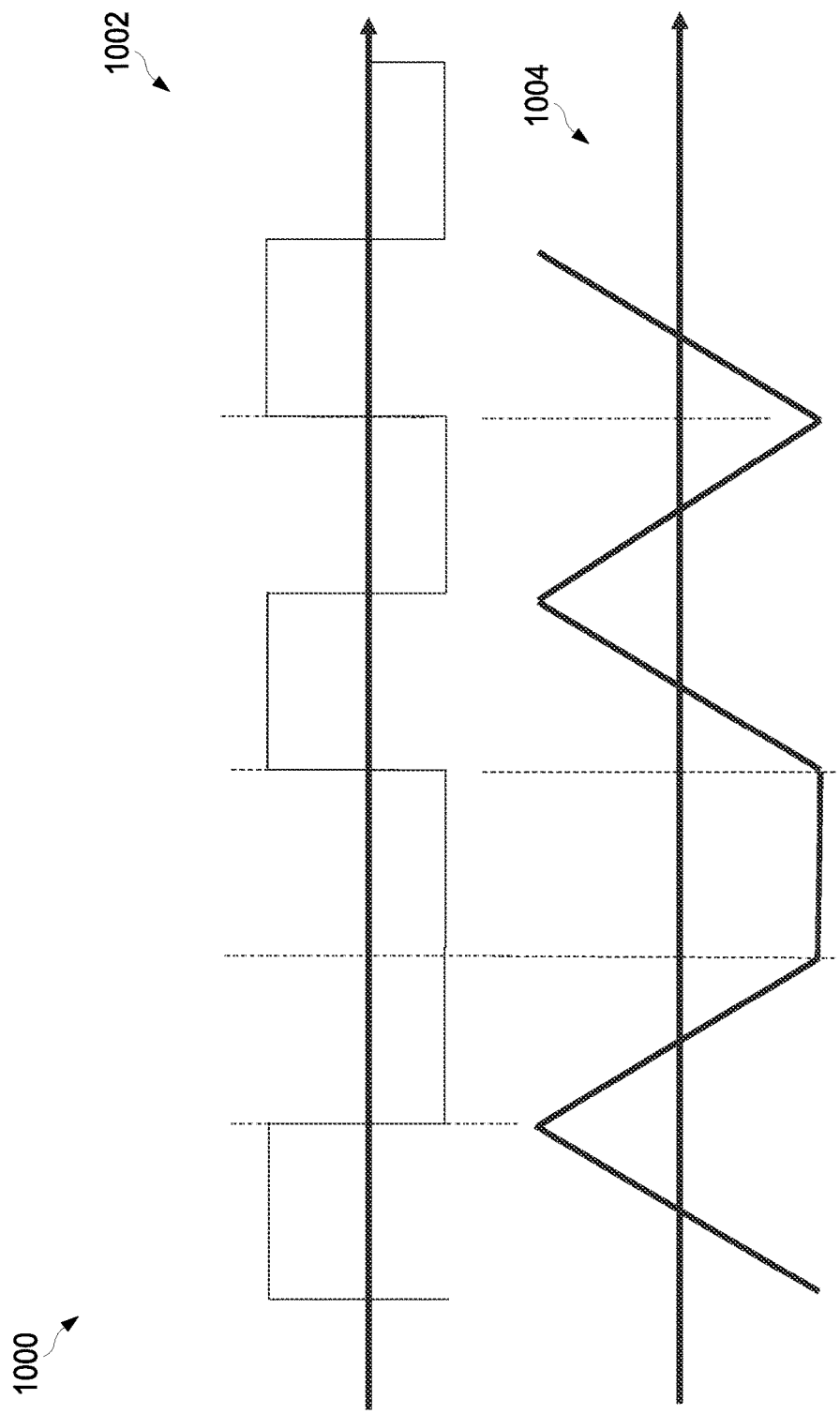
FIG. 10 is an embodiment timing diagram of available response by a matched filter to a Qi-Compliant BMC encoded input signal.

FIG. 10 illustrates an embodiment timing diagram 1000 of available response 1004 by a matched filter to a Qi-Compliant BMC encoded input signal 1002. In a Qi-compliant BMC encoding, the modulated signal has a systematic edge on the rising edge of the 2 kHz clock. Apart from the initial transient after a reset, the only admitted variations of the matched filter output y[k]−y[k−1] are pulses with the same sign (0), a positive pulse followed by a negative pulse (−2), or a negative pulse followed by a positive pulse (+2). Accordingly, a comparison of the value y[k] and y[k−1], can be exploited for edge detection.

Figure 11:
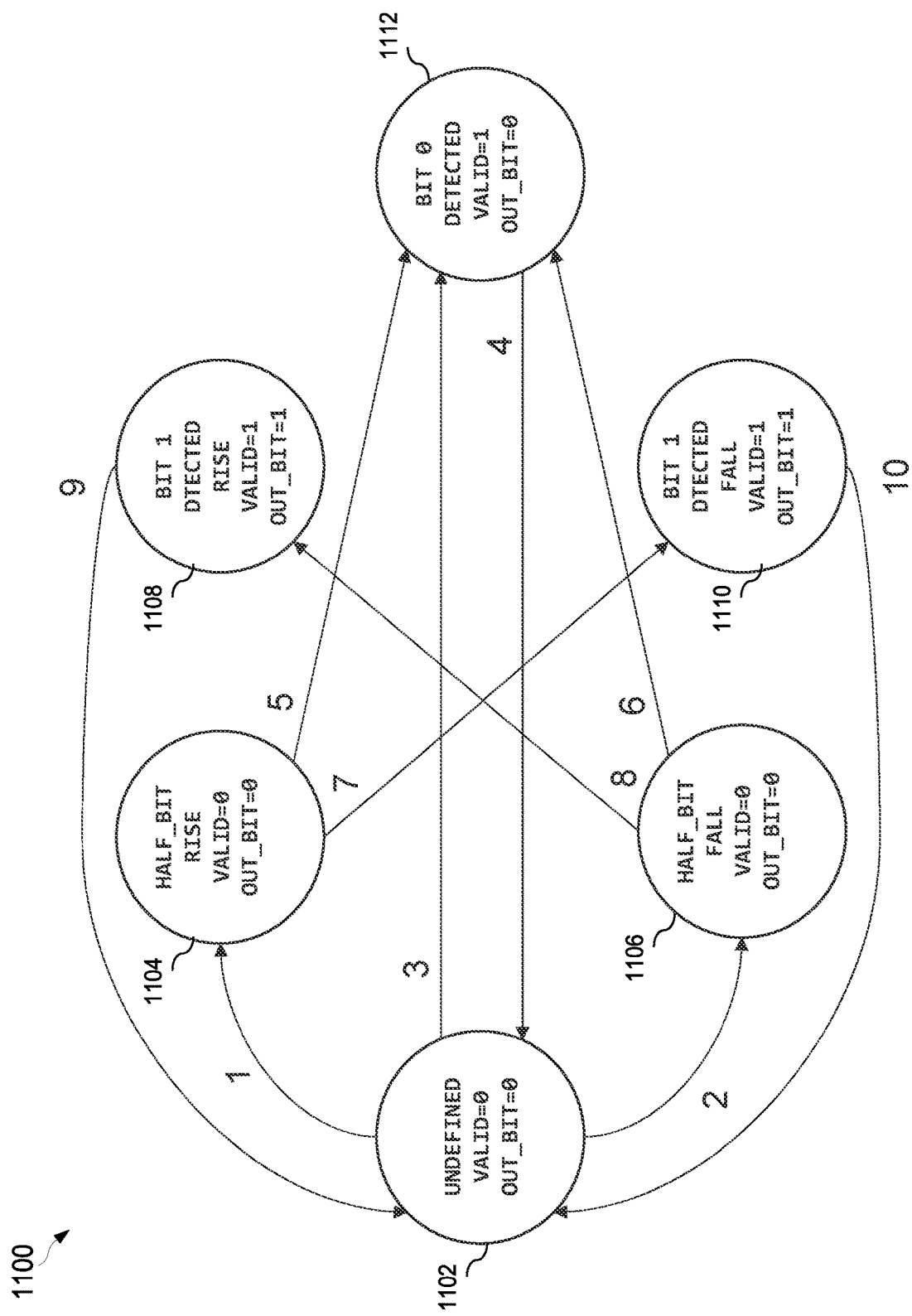
FIG. 11 is a state diagram of an embodiment finite state machine (FSM)

FIG. 11 illustrates a state diagram of an embodiment finite state machine (FSM) 1100. FIG. 12 illustrates a corresponding state transition table 1200, where "0", "1," and "−" (don't care) are the possible values of each FSM 1100 input. FSM 1100 is a Moore machine with six states Q (1102-1112) and ten transitions. Typical to a Moore machine, the input influences the next state (i.e., subsequent output). The number of states, type of FSM, and the number of transitions is non-limiting, and other finite state machines are similarly contemplated.

Start state 1102 is either starting from an initial state (e.g., reset) or is the next transition from one of bit "1" detected rise state 1108, bit "1" detected fall state 1110, or bit "0" detected state 1112. Start state 1102 transitions to one of half-bit rise state 1104, half-bit fall state 1106, or bit "0" detected state 1112 based on the half-bit rise, half-bit fall, full-bit rise, and full-bit fall detection of the signal to be decoded from the response of the matched filters 602a-b.

FSM 1100 transitions from start state 1102 to half-bit rise state 1104 in response to a half-bit rise, NO full-bit rise, AND NO full-bit fall detection of the signal to be decoded, corresponding to the first transition (1).

FSM 1100 transitions from half-bit rise state 1104 to bit "0" detected state 1112 in response to NO half-bit fall detection AND full-bit rise detection of the signal to be decoded, corresponding to the fifth transition (5). Accordingly, the decoded output of FSM 1100 is a "0."

However, FSM 1100 transitions from half-bit rise state 1104 to bit "1" detected fall state 1110 in response to a half-bit fall detection of the signal to be decoded, corresponding to the seventh transition (7). Accordingly, the decoded output of FSM 1100 is a "1."

FSM 1100 transitions from start state 1102 to half-bit fall state 1106 in response to a half-bit fall, NO full-bit rise, AND NO full-bit fall detection of the signal to be decoded, corresponding to the second transition (2).

FSM 1100 transitions from half-bit fall state 1106 to bit "0" detected state 1112 in response to NO half-bit rise detection AND full-bit fall detection of the signal to be decoded, corresponding to the sixth transition (6). Accordingly, the decoded output of FSM 1100 is a "0."

However, the FSM 1100 transitions from half-bit fall state 1106 to bit "1" detected rise state 1108 in response to a half-bit rise detection of the signal to be decoded, corresponding to the eight transition (8). Accordingly, the decoded output of FSM 1100 is a "1."

FSM 1100 transitions directly from start state 1102 to bit "0" detected state 1112 in response to either a (i) full-bit rise and NO full-bit fall, or a (ii) No full-bit rise and full-bit fall detection of the signal to be decoded, corresponding to the third transition (3). Accordingly, the decoded output of FSM 1100 is a "0."

Finally, FSM 1100 transitions from bit "1" detected rise state 1108 to the start state 1102 (UNDEFINED), corresponding to the ninth transition (9); from bit "1" detected fall state 1110 to the start state 1102 (UNDEFINED), corresponding to the tenth transition (10); or from bit "0" detected state 1112 to the start state 1102 (UNDEFINED), corresponding to the fourth transition (4)—to restore the initial state of FSM 1100.

Figure 13:
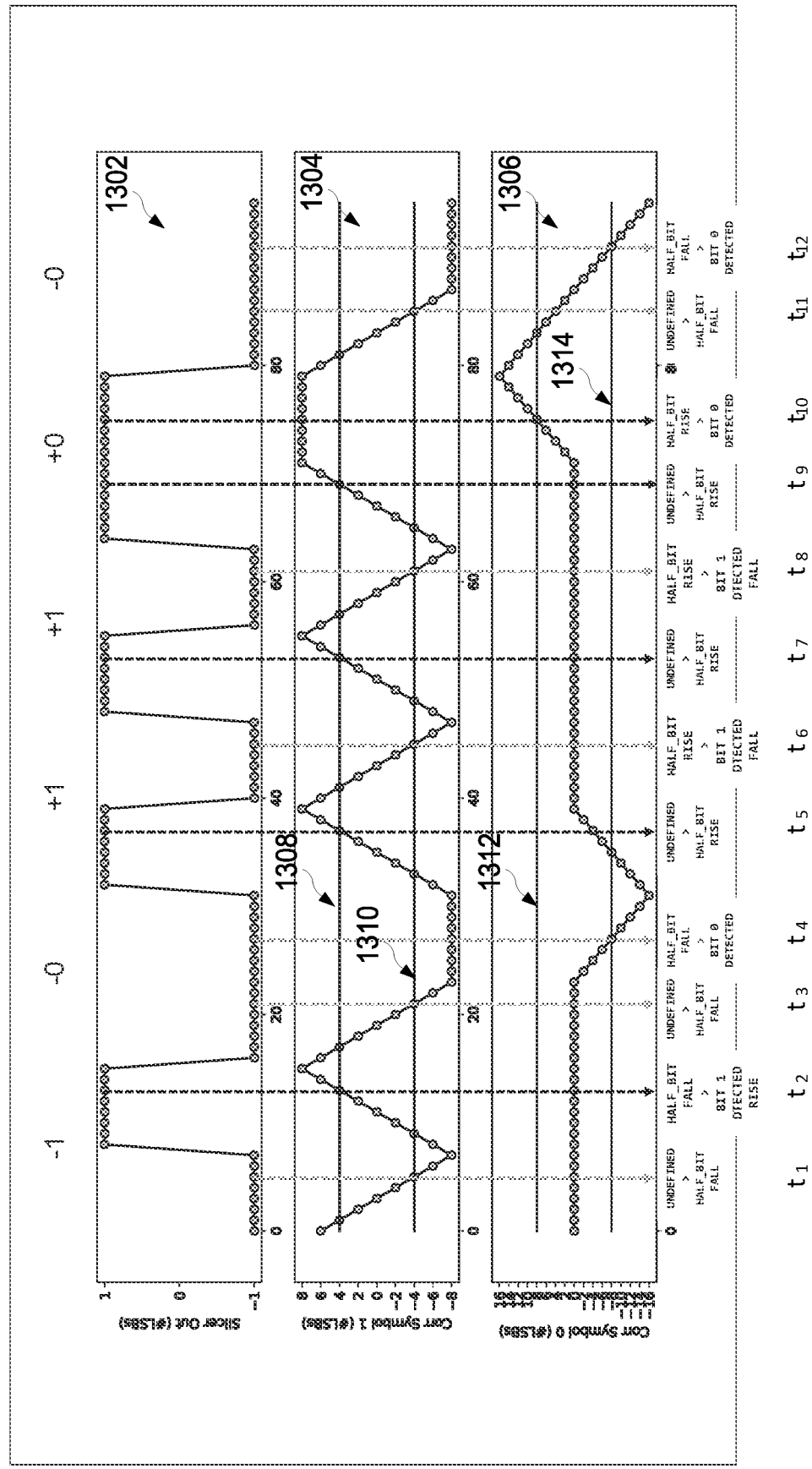
FIG. 13 is a timing diagram of a first signal, a second signal, and a third signal.

FIG. 13 illustrates timing diagram 1300 of a first signal 1302, a second signal 1304, and a third signal 1306. The dots on the diagram represent sampling points in accordance with the sampling rate of ADC 402. The connecting lines between the dots are for illustrative purposes. The operation of decoder circuit 600 is illustratively described using these diagrams.

First signal 1302 is an output of data slicer 408, corresponding to an example of a BMC encoded ASK modulated signal, and, thus, non-limiting. Data slicer 408 provides a binary output (e.g., +1) based on a determination of whether an input to the data slicer 408 is above or below a threshold. In embodiments, in response to the input to the data slicer 408 being above the threshold, the output is "+1," and in response to the input to the data slicer 408 being below the threshold, the output is "−1." First signal 1302 is digitally represented with a 1-bit resolution (i.e., +1 bit)—non-limiting.

Second signal 1304 is a response of matched filter 602a to the output of data slicer 408 in accordance with the first signal based on Symbol 1. Matched filter 602a matches pulses on the half clock period. Second signal 1304 is digitally represented on five bits (to represent the expected extremal values+8), assuming that the Symbol 1 length is n=16.

Third signal 1306 is a response of matched filter 602b to the output of data slicer 408 in accordance with the first signal based on Symbol 0. Matched filter 602b matches pulses on the full clock period. Third signal 1306 is digitally represented on six bits (to represent the expected extremal values+16 bits), assuming that the Symbol 0 length is n=16.

A first upper threshold 1308 and a first lower threshold 1310 are used as threshold determinations for the second signal 1304. In embodiments, the first upper threshold 1308 equals half the positive quantization levels of the second signal 1304. In embodiments, the value of the first lower threshold 1310 equals half the negative quantization levels of the second signal 1304. For example, in an embodiment where the second signal 1304 is digitally on five bits (extremal values+8), the value of the first upper threshold 1308 is "+4," and the value of the first lower threshold 1310 is "−4."

A second upper threshold 1312 and a second lower threshold 1314 are used as threshold determinations for third signal 1306. In embodiments, the second upper threshold 1312 equals half the positive quantization levels of the third signal 1306. In embodiments, the value of the second lower threshold 1314 equals half the negative quantization levels of the third signal 1306. For example, in an embodiment where the third signal 1306 is digitally represented on six bits (extremal values+16), the value of the second upper threshold 1312 is "+8," and the value of the second lower threshold 1314 is "−8."

At time $t_1$, a half-bit fall (second signal 1304 crosses the first lower threshold 1310) is detected AND NO full-bit rise AND NO full-bit fall (third signal 1306 is in-between the second upper threshold 1312 and the second lower threshold 1314) are detected. This corresponds to the second transition in FSM 1100 from the start state 1102 (UNDEFINED) to half-bit fall state 1106. At time $t_2$, a half-bit rise (second signal 1304 crosses the first upper threshold 1308) is detected, corresponding to the eighth transition in FSM 1100 from half-bit fall state 1106 to bit "1" detected rise state 1108. Accordingly, the decoded output of FSM is a "1." FSM 1100 transitions (i.e., ninth transition) from bit "1" detected rise state 1108 to the UNDEFINED state of start state 1102.

At time $t_3$, a half-bit fall (second signal 1304 crosses the first lower threshold 1310) is detected AND NO full-bit rise AND NO full-bit fall (third signal 1306 is in-between the second upper threshold 1312 and the second lower threshold 1314) are detected. This corresponds to the second transition in FSM 1100 from the start state 1102 (UNDEFINED) to half-bit fall state 1106. At time $t_4$, a NO half-bit rise (second signal 1304 is less than the first lower threshold 1310) AND full-bit fall (third signal 1306 crosses the second lower threshold 1314) is detected, corresponding to the sixth transition in FSM 1100 from half-bit fall state 1106 to bit "0" detected state 1112. Accordingly, the decoded output of FSM is a "0." FSM 1100 transitions (i.e., fourth transition) from bit "0" detected state 1112 to the UNDEFINED state of start state 1102.

At time $t_5$, a half-bit rise (second signal 1304 crosses the first upper threshold 1308) is detected AND NO full-bit rise AND NO full-bit fall (third signal 1306 is in-between the second upper threshold 1312 and the second lower threshold 1314) are detected. This corresponds to the first transition in FSM 1100 from the start state 1102 (UNDEFINED) to the half-bit rise state 1104. At time to, a half-bit fall (second signal 1304 crosses the first lower threshold 1310) is detected, corresponding to the seventh transition in FSM 1100 from half-bit rise state 1104 to bit "1" detected fall state 1110. Accordingly, the decoded output of FSM is a "1." FSM 1100 transitions (i.e., tenth transition) from bit "1" detected fall state 1110 to the start state 1102 (UNDEFINED).

At time $t_7$, a half-bit rise (second signal 1304 crosses the first upper threshold 1308) is detected AND NO full-bit rise AND NO full-bit fall (third signal 1306 is in-between the second upper threshold 1312 and the second lower threshold 1314) are detected. This corresponds to the first transition in FSM 1100 from the start state 1102 (UNDEFINED) to the half-bit rise state 1104. At time to, a half-bit fall (second signal 1304 crosses the first lower threshold 1310) is detected, corresponding to the seventh transition in FSM 1100 from half-bit rise state 1104 to bit "1" detected fall state 1110. Accordingly, the decoded output of FSM is a "1." FSM 1100 transitions (i.e., tenth transition) from bit "1" detected fall state 1110 to the start state 1102 (UNDEFINED).

At time $t_9$, a half-bit rise (second signal 1304 crosses the first upper threshold 1308) is detected AND NO full-bit rise AND NO full-bit fall (third signal 1306 is in-between the second upper threshold 1312 and the second lower threshold 1314) are detected. This corresponds to the first transition in FSM 1100 from the start state 1102 (UNDEFINED) to the half-bit rise state 1104. At time $t_{10}$, a NO hall-fall (second signal 1304 is greater than the first upper threshold 1308) AND full-bit rise (third signal 1306 crosses the second upper threshold 1312) is detected, corresponding to the fifth transition in FSM 1100 from half-bit rise state 1104 to bit "0" detected state 1112. Accordingly, the decoded output of FSM is a "0." FSM 1100 transitions (i.e., fourth transition) from bit "0" detected state 1112 to the start state 1102 (UNDEFINED).

At time $t_{11}$, a half-bit fall (second signal 1304 crosses the first lower threshold 1310) is detected AND NO full-bit rise AND NO full-bit fall (third signal 1306 is in-between the second upper threshold 1312 and the second lower threshold 1314) are detected. This corresponds to the second transition in FSM 1100 from the start state 1102 (UNDEFINED) to the half-bit fall state 1106. At time $t_{12}$, a NO half-bit rise (second signal 1304 is less than the first lower threshold 1310) AND full-bit fall (third signal 1306 crosses the second lower threshold 1314) is detected, corresponding to the sixth transition in FSM 1100 from half-bit fall state 1106 to bit "0" detected state 1112. Accordingly, the decoded output of FSM is a "0." FSM 1100 transitions (i.e., fourth transition) from bit "0" detected state 1112 to the start state 1102 (UNDEFINED).

Figures 14A, 14B:
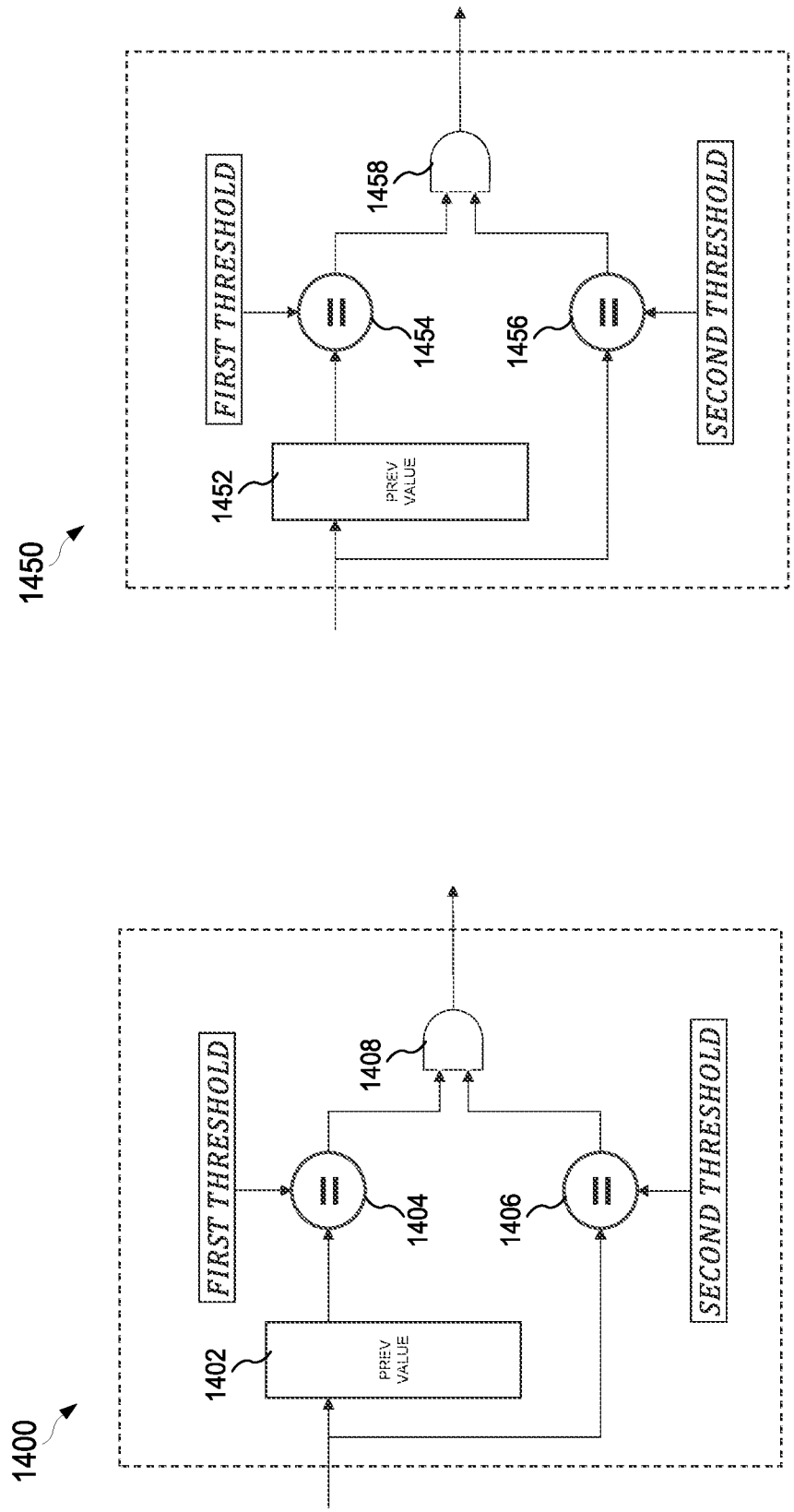
FIGS. 14a and 14b are block diagrams for an embodiment rising detector circuit and falling detector circuit, respectively.

FIGS. 14a and 14b illustrate block diagrams for an embodiment rising detector circuit 1400 and falling detector circuit 1450, respectively. Rising detector circuit 1400 corresponds to rising detector circuit 604a-b, and falling detector circuit 1450 corresponds to falling detector circuit 606a-b.

Rising detector circuit 1400 includes a register 1402, to store the previous value, a first comparator 1404, a second comparator 1406, and an AND gate 1408. The input of the rising detector circuit 1400 is coupled to the output of one of the matched filters 602a-b. The output of the rising detector circuit 1400 is coupled to the input of FSM 1100.

Each digital sample is received at register 1402 and second comparator 1406. Register 1402 stores the previous digital sample, which is fed to first comparator 1404 at the same time the current digital sample is fed to second comparator 1406. First comparator 1404 determines whether the previous digital sample equals a first threshold. Second comparator 1406 determines whether the current digital sample equals a second threshold.

The outputs of first comparator 1404 and second comparator 1406 are fed to AND gate 1408, which returns a high value in response to the previous digital sample being equal to the first threshold and the current digital sample being equal to the second threshold, which indicates that the current digital sample is a rising signal, crossing the first threshold. Otherwise, the output of the AND gate 1408 is a low value, which indicates that the current digital sample is not a rising signal and not crossing the first threshold.

In an embodiment, the first threshold and second threshold of rising detector circuit 1400 have a positive value. In an embodiment, the first threshold equals "+n/4" for a rising detector circuit 1400 coupled to matched filter 602a. In an embodiment, the first threshold equals "+n/2" for a rising detector circuit 1400 coupled to matched filter 602b. In an embodiment, the second threshold has a value equal to the first threshold plus two, regardless of whether the rising detector circuit 1400 is coupled to the matched filter 602a or 602b.

For example, if the input to matching filter was sampled 16 times within a clock period (n=16), the value of the first threshold is "+4," and the value of the second threshold is "+6" for the rising detector circuit 1400 coupled to matched filter 602a. The value of the first threshold is "+8," and the value of the second threshold is "+10" for the rising detector circuit 1400 coupled to matched filter 602b. The second threshold can be justified by the fact that the minimum positive variation of the matching filter signals (e.g., 904) is +2.

Falling detector circuit 1450 includes a register 1452, a first comparator 1454, a second comparator 1456, and an AND gate 1458. The input of the falling detector circuit 1450 is coupled to the output of one of the matched filters 602a-b. The output of the falling detector circuit 1450 is coupled to FSM 1100.

Each digital sample is received at register 1452 and second comparator 1456. Register 1452 stores the previous digital sample, which is fed to the first comparator 1454 at the same time the current digital sample is fed to the second comparator 1456. First comparator 1454 determines whether the previous digital sample equals a first threshold. Second comparator 1456 determines whether the current digital sample equals a second threshold.

The outputs of first comparator 1454 and second comparator 1456 are fed to AND gate 1458, which returns a high value in response to the previous digital sample being equal to the first threshold and the current digital sample being equal to the second threshold, which indicates that the current digital sample is a falling signal, crossing the first threshold. Otherwise, the output of the AND gate 1458 is a low value, which indicates that the current digital sample is not a falling signal and not crossing the first upper threshold.

In an embodiment, the first threshold and second threshold of falling detector circuit 1450 have a negative value. In an embodiment, the first threshold equals "−n/4" for a falling detector circuit 1450 coupled to matched filter 602a. In an embodiment, the first threshold equals "−n/2" for a falling detector circuit 1450 coupled to matched filter 602b. In an embodiment, the second threshold has a value equal to the first threshold minus two, regardless of whether the falling detector circuit 1450 is coupled to the matched filter 602a or 602b. The second threshold can be justified by the fact that the minimum negative variation of the matching filter signals (e.g., 904) is −2.

For example, if the input to matching filter was sampled 16 times within a clock period (n=16), the value of the first threshold is "−4," and the value of the second threshold is "−6" for the falling detector circuit 1450 coupled to matched filter 602a. The value of the first threshold is "−8," and the value of the second threshold is "−10" for the falling detector circuit 1450 coupled to matched filter 602b.

In embodiments, the carrier frequency range of the signal to be decoded is between 100 kHz and 220 kHz.

Figure 15:
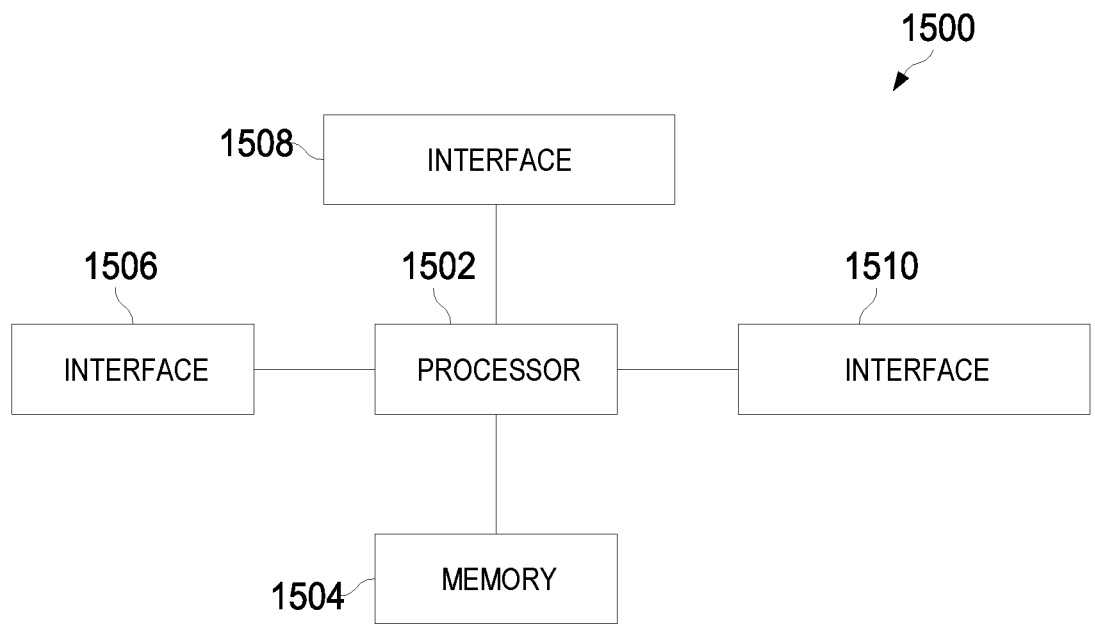
FIG. 15 is a block diagram of an embodiment processing system, which may be coupled to the decoder circuit.

FIG. 15 illustrates a block diagram of an embodiment processing system 1500, which may be coupled to the decoder circuit 600. As shown, the processing system 1500 includes a processor 1502, a memory 1504, and interfaces 1506, 1508, and 1510, which may (or may not) be arranged as shown. The processing system 1500 may include additional components not depicted, such as long-term storage (e.g., non-volatile memory, etc.), measurement devices, and the like.

In embodiments, decoder circuit 600 is arranged on a System-on-Chip (SoC). In embodiments, a microcontroller unit of the, for example, transmitting device 110 is a master processing unit and the processor 1502 is a slave processing unit.

Processor 1502 may be any component or collection of components adapted to perform computations or other processing related tasks. Memory 1504 may be any component or collection of components adapted to store programming or instructions for execution by the processor 1502. In an embodiment, the memory 1504 includes a non-transitory computer readable medium.

Interfaces 1506, 1508, and 1510 may be any component or collection of components that allow the processor 1502 to communicate with other devices/components or a user. For example, interfaces 1506, 1508, and 1510 may be adapted to communicate data, control, or management messages from processor 1502 to the matched filter 602a-b, rising detector circuits 604a-b, falling detector circuits 606a-b, or the FSM 1100, based on instructions or configurations stored in memory 1504.

As another example, interface 1506 may be adapted to allow a user or device (e.g., personal computer (PC), etc.) to interact/communicate with the processing system 1500.

Figure 16:
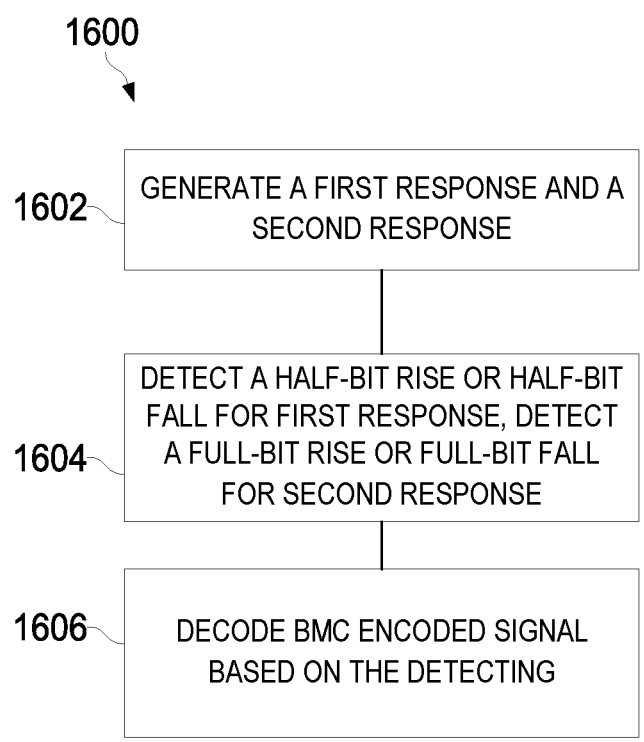
FIG. 16 is a flow chart of an embodiment method for operating the decoder circuit to decode a biphase mark coding (BMC) encoded signal.

FIG. 16 illustrates a flow chart of an embodiment method 1600 for operating the decoder circuit 600 to decode a biphase mark coding (BMC) encoded signal. In embodiments, the decoder circuit 600 is a decoder circuit of an ASK demodulator 500.

At step 1602, a first response and a second response to the BMC encoded signal is generated by a matched filter circuit. In embodiments, the first response is based on a half-clock period and the second response is based on a full-clock period of the BMC encoded signal.

In embodiments, the first response is generated by a first matched filter matching pulses on the half clock period. In embodiments, the second response is generated by a second matched filter matching pulses on the full clock period.

At step 1604, an output signal based on detecting a half-bit rise for the first response, a half-bit fall for the first response, a full-bit rise for the second response, or a full-bit fall for the second response is generated by a detector circuit coupled to the matched filter.

In embodiments, a first rising detector circuit generates a first output corresponding to a half-bit rise based on determining whether the first response has a rising transition and crossing a first threshold at the half clock period.

In embodiments, a first falling detector circuit generates a second output corresponding to a half-bit fall based on determining whether the first response has a falling transition and crossing a second threshold at the half clock period.

In embodiments, a second rising detector circuit generates a third output corresponding to the full-bit rise based on determining whether the second response has a rising transition and crossing a third threshold at the full clock period.

In embodiments, a second falling detector circuit generates a fourth output corresponding to the full-bit fall based on determining whether the second response has a falling transition and crossing a fourth threshold at the full clock period.

At step 1606, the BMC encoded signal is decoded by a finite state machine (FSM) circuit based on the output signal of the detector circuits. In embodiments, the decoding includes the recognition of the BMC encoded signal based on the first output, the second output, the third output, the fourth output, or a combination thereof. In embodiments, the matched filter, the detector circuit, and the FSM circuit operate asynchronously.

In embodiments, the FSM circuit is a six-state FSM circuit. In embodiments, the FSM circuit includes a start state, a half-bit rise state, a bit "1" detected fall state, a half-bit fall state, a bit "1" detected rise state, and a bit "0" detected state In embodiments, the FSM circuit transitions from the start state to the half-bit rise state in response to detecting a half-bit rise and not detecting a full-bit rise or a full-bit fall.

In embodiments, the FSM circuit transitions from the half-bit rise state to the bit "1" detected fall state in response to detecting a half-bit fall. The decoded output of the FSM circuit at the bit "1" detected fall state is a "1."

In embodiments, the FSM circuit transitions from the start state to the half-bit fall state in response to detecting a half-bit fall and not detecting a full-bit rise or a full-bit fall.

In embodiments, the FSM circuit transitions from the half-bit fall state to the bit "1" detected rise state in response to detecting a half-bit rise. The decoded output of the FSM circuit at the bit "1" detected rise state is a "1."

In embodiments, the FSM circuit transitions from the half-bit rise state to the bit "0" detected state in response to not detecting a half-bit fall and detecting a full-bit rise. In embodiments, the FSM circuit transitions from the half-bit fall state to the bit "0" detected state in response to detecting a full-bit fall and not detecting a half-bit rise. In embodiments, the FSM circuit transitions from the start state to the bit "0" detected state in response to detecting a full-bit rise and not detecting a full-bit fall or detecting a full-bit fall and not detecting a full-bit rise. The decoded output of the FSM circuit at the bit "0" detected is a "0".

It is noted that all steps outlined in the flow charts of method 1600 are not necessarily required and some steps can be optional. Further, changes to the arrangement of the steps, removal of one or more steps and path connections, and addition of steps and path connections are similarly contemplated.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A circuit for decoding a biphase mark coding (BMC) encoded signal, the circuit comprising:
    a matched filter configured to generate a first response and a second response to the BMC encoded signal, the first response and second response operating, respectively, at a half clock period and a full clock period of the BMC encoded signal;
    a detector circuit coupled to an output of the matched filter, the detector circuit configured to generate an output signal based on detecting a half-bit rise for the first response, a half-bit fall for the first response, a full-bit rise for the second response, or a full-bit fall for the second response; and
    a finite state machine (FSM) circuit configured to decode the BMC encoded signal based on the output signal of the detector circuit.

2. The circuit of claim 1, wherein the matched filter comprises:
    a first matched filter configured to match pulses on the half clock period and generate the first response; and
    a second matched filter configured to match pulses on the full clock period and generate the second response.

3. The circuit of claim 1, wherein the detector circuit comprises:
    a first rising detector circuit configured to generate a first output corresponding to the half-bit rise based on determining whether the first response has a rising transition and crossing a first threshold at the half clock period;
    a first falling detector circuit configured to generate a second output corresponding to the half-bit fall based on determining whether the first response has a falling transition and crossing a second threshold at the half clock period;
    a second rising detector circuit configured to generate a third output corresponding to the full-bit rise based on determining whether the second response has a rising transition and crossing a third threshold at the full clock period; and
    a third falling detector circuit configured to generate a fourth output corresponding to the full-bit fall based on determining whether the second response has a falling transition and crossing a fourth threshold at the full clock period.

4. The circuit of claim 3, wherein the FSM circuit is configured to decode the BMC encoded signal comprises decoding the BMC encoded signal based on the first output, the second output, the third output, the fourth output, or a combination thereof.

5. The circuit of claim 1, wherein the circuit is an asynchronous circuit.

6. The circuit of claim 1, wherein the FSM circuit is a six-state FSM circuit.

7. The circuit of claim 1, wherein the FSM circuit comprises:
    a start state;
    a half-bit rise state, wherein the FSM circuit transitions from the start state to the half-bit rise state in response to detecting the half-bit rise and not detecting the full-bit rise or the full-bit fall;
    a bit "1" detected fall state, wherein the FSM circuit transitions from the half-bit rise state to the bit "1" detected fall state in response to detecting the half-bit fall, and wherein a decoded output of the FSM circuit is a "1";
    a half-bit fall state, wherein the FSM circuit transitions from the start state to the half-bit fall state in response to detecting the half-bit fall and not detecting the full-bit rise or the full-bit fall;
    a bit "1" detected rise state, wherein the FSM circuit transitions from the half-bit fall state to the bit "1" detected rise state in response to detecting the half-bit rise, wherein the decoded output of the FSM circuit is a "1"; and
    a bit "0" detected state, wherein the FSM circuit transitions from the half-bit rise state to the bit "0" detected state in response to not detecting the half-bit fall and detecting the full-bit rise, wherein the FSM circuit transitions from the half-bit fall state to the bit "0" detected state in response to detecting the full-bit fall and not detecting the half-bit rise, wherein the FSM circuit transitions from the start state to the bit "0" detected state in response to detecting the full-bit rise and not detecting the full-bit fall or detecting the full-bit fall and not detecting the full-bit fall, and wherein the decoded output of the FSM circuit is a "0".

8. A method for decoding a biphase mark coding (BMC) encoded signal, the method comprising:
    generating, by a matched filter, a first response and a second response to the BMC encoded signal, the first response and second response operating, respectively, at a half clock period and a full clock period of the BMC encoded signal;
    generating, by a detector circuit coupled to the matched filter, an output signal based on detecting a half-bit rise for the first response, a half-bit fall for the first response, a full-bit rise for the second response, or a full-bit fall for the second response; and
    decoding the BMC encoded signal, by a finite state machine (FSM) circuit, based on the output signal of the detector circuit.

9. The method of claim 8, wherein the generating the first response and the second response comprises:
    generating the first response by a first matched filter matching pulses on the half clock period; and
    generating the second response by a second matched filter matching pulses on the full clock period.

10. The method of claim 8, wherein generating the output signal comprises:
    generating, by a first rising detector circuit, a first output corresponding to the half-bit rise based on determining whether the first response has a rising transition and crossing a first threshold at the half clock period;
    generating, by a first falling detector circuit, a second output corresponding to the half-bit fall based on determining whether the first response has a falling transition and crossing a second threshold at the half clock period;
    generating, by a second rising detector circuit, a third output corresponding to the full-bit rise based on determining whether the second response has a rising transition and crossing a third threshold at the full clock period; and
    generating, by a second falling detector circuit, a fourth output corresponding to the full-bit fall based on determining whether the second response has a falling transition and crossing a fourth threshold at the full clock period.

11. The method of claim 10, wherein the decoding the BMC encoded signal comprises decoding the BMC encoded signal based on the first output, the second output, the third output, the fourth output, or a combination thereof.

12. The method of claim 8, wherein the matched filter, the detector circuit, and the FSM circuit operate asynchronously.

13. The method of claim 8, wherein the FSM circuit is a six-state FSM circuit.

14. The method of claim 8, wherein the FSM comprises:
a start state;
a half-bit rise state, wherein the FSM circuit transitions from the start state to the half-bit rise state in response to detecting the half-bit rise and not detecting the full-bit rise or the full-bit fall;
a bit "1" detected fall state, wherein the FSM circuit transitions from the half-bit rise state to the bit "1" detected fall state in response to detecting the half-bit fall, and wherein a decoded output of the FSM circuit is a "1";
a half-bit fall state, wherein the FSM circuit transitions from the start state to the half-bit fall state in response to detecting the half-bit fall and not detecting the full-bit rise or the full-bit fall;
a bit "1" detected rise state, wherein the FSM circuit transitions from the half-bit fall state to the bit "1" detected rise state in response to detecting the half-bit rise, wherein the decoded output of the FSM circuit is a "1"; and
a bit "0" detected state, wherein the FSM circuit transitions from the half-bit rise state to the bit "0" detected state in response to not detecting the half-bit fall and detecting the full-bit rise, wherein the FSM circuit transitions from the half-bit fall state to the bit "0" detected state in response to detecting the full-bit fall and not detecting the half-bit rise, wherein the FSM circuit transitions from the start state to the bit "0" detected state in response to detecting the full-bit rise and not detecting the full-bit fall or detecting the full-bit fall and not detecting the full-bit fall, and wherein the decoded output of the FSM circuit is a "0".

15. An amplitude shift keying (ASK) demodulator for decoding a biphase mark coding (BMC) encoded signal, the ASK demodulator comprising:
a matched filter configured to generate a first response and a second response to the BMC encoded signal, the first response and second response operating, respectively, at a half clock period and a full clock period of the BMC encoded signal;
a detector circuit coupled to an output of the matched filter, the detector circuit configured to generate an output signal based on detecting a half-bit rise for the first response, a half-bit fall for the first response, a full-bit rise for the second response, or a full-bit fall for the second response; and
a finite state machine (FSM) circuit configured to decode the BMC encoded signal based on the output signal of the detector circuit.

16. The ASK demodulator of claim 15, further comprising a data slicer coupled to an input of the matching filter, the data slicer configured to:
determine whether an input to the data slicer is above or below a threshold; and
generate a positive binary value in response to detecting the input to the data slicer being above the threshold, and a negative binary value in response to detecting the input to the data slicer being below the threshold.

17. The ASK demodulator of claim 15, wherein the detector circuit comprises:
a first rising detector circuit configured to generate a first output corresponding to the half-bit rise based on determining whether the first response has a rising transition and crossing a first threshold at the half clock period;
a first falling detector circuit configured to generate a second output corresponding to the half-bit fall based on determining whether the first response has a falling transition and crossing a second threshold at the half clock period;
a second rising detector circuit configured to generate a third output corresponding to the full-bit rise based on determining whether the second response has a rising transition and crossing a third threshold at the full clock period; and
a third falling detector circuit configured to generate a fourth output corresponding to the full-bit fall based on determining whether the second response has a falling transition and crossing a fourth threshold at the full clock period.

18. The ASK demodulator of claim 17, wherein the FSM circuit is configured to decode the BMC encoded signal comprises decoding the BMC encoded signal based on the first output, the second output, the third output, the fourth output, or a combination thereof.

19. The ASK demodulator of claim 15, wherein the FSM circuit is a six-state FSM circuit.

20. The ASK demodulator of claim 15, wherein the FSM circuit comprises:
a start state;
a half-bit rise state, wherein the FSM circuit transitions from the start state to the half-bit rise state in response to detecting the half-bit rise and not detecting the full-bit rise or the full-bit fall;
a bit "1" detected fall state, wherein the FSM circuit transitions from the half-bit rise state to the bit "1" detected fall state in response to detecting the half-bit fall, and wherein a decoded output of the FSM circuit is a "1";
a half-bit fall state, wherein the FSM circuit transitions from the start state to the half-bit fall state in response to detecting the half-bit fall and not detecting the full-bit rise or the full-bit fall;
a bit "1" detected rise state, wherein the FSM circuit transitions from the half-bit fall state to the bit "1" detected rise state in response to detecting the half-bit rise, wherein the decoded output of the FSM circuit is a "1"; and
a bit "0" detected state, wherein the FSM circuit transitions from the half-bit rise state to the bit "0" detected state in response to not detecting the half-bit fall and detecting the full-bit rise, wherein the FSM circuit transitions from the half-bit fall state to the bit "0" detected state in response to detecting the full-bit fall and not detecting the half-bit rise, wherein the FSM circuit transitions from the start state to the bit "0" detected state in response to detecting the full-bit rise and not detecting the full-bit fall or detecting the full-bit fall and not detecting the full-bit fall, and wherein the decoded output of the FSM circuit is a "0".

* * * * *